US011427067B2

(12) United States Patent
Toda et al.

(10) Patent No.: US 11,427,067 B2
(45) Date of Patent: Aug. 30, 2022

(54) VEHICLE DRIVE DEVICE

(71) Applicant: Mazda Motor Corporation, Hiroshima (JP)

(72) Inventors: Isao Toda, Hiroshima (JP); Seiyo Hirano, Hiroshima (JP); Kei Yonemori, Hiroshima (JP); Hideki Sanai, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 59 days.

(21) Appl. No.: 16/981,288

(22) PCT Filed: Mar. 19, 2019

(86) PCT No.: PCT/JP2019/011428

§ 371 (c)(1),
(2) Date: Sep. 16, 2020

(87) PCT Pub. No.: WO2019/181934

PCT Pub. Date: Sep. 26, 2019

(65) Prior Publication Data

US 2021/0039509 A1 Feb. 11, 2021

(30) Foreign Application Priority Data

Mar. 20, 2018 (JP) ............................ JP2018-052636
Jul. 31, 2018 (JP) ............................ JP2018-143355

(51) Int. Cl.
*B60K 1/04* (2019.01)
*B60L 50/16* (2019.01)
(Continued)

(52) U.S. Cl.
CPC .................. *B60K 1/04* (2013.01); *B60K 1/02* (2013.01); *B60K 6/24* (2013.01); *B60K 6/28* (2013.01);
(Continued)

(58) Field of Classification Search
CPC .................................................... B60K 7/0007
See application file for complete search history.

(56) References Cited

U.S. PATENT DOCUMENTS 6,007,451 A 12/1999 Matsui et al.
7,552,787 B1 * 6/2009 Williams ................ B60K 6/26 180/65.51
(Continued)

FOREIGN PATENT DOCUMENTS

JP H10-042406 A 2/1998
JP 2004-187412 A 7/2004
(Continued)

OTHER PUBLICATIONS

Extended European search report dated Mar. 11, 2021, in corresponding European patent Application No. 19770753.2, 9 pages.
(Continued)

*Primary Examiner* — Erez Gurari
(74) *Attorney, Agent, or Firm* — Xsensus LLP

(57) ABSTRACT

To provide a vehicle drive device capable of efficiently driving a vehicle by using in-wheel motors without falling into the vicious cycle between enhancement of driving via the motors and an increase in vehicle weight. The present invention is a vehicle drive device that uses in-wheel motors to drive a vehicle and includes in-wheel motors (20) that are provided in wheels (**2*b*) of a vehicle (1**) and drive wheels, in which the in-wheel motors generate the maximum output power in a high revolutions range equal to or more than a predetermined number of revolutions that is more than zero.

12 Claims, 14 Drawing Sheets

1
2b
2a
17kW × 2
P4 motor
10
20
26a
20a
INTEGRATED UNIT
HIGH VOLTAGE DCDC
INV
22
12
16
16a
18
14c
14a
CHARGE
CAP
INV
48V LiB
3.5kWh
26b
LOW VOLTAGE DCDC
INV
14
25kW 48V P1Motor
14b
20a
12V ELECTRIC COMPONENTS OF VEHICLE
20
24
2b
2a

(51) Int. Cl.

| | |
|---|---|
| ***B60K 6/24*** | (2007.10) |
| ***B60K 6/28*** | (2007.10) |
| ***B60K 6/44*** | (2007.10) |
| ***B60L 15/20*** | (2006.01) |
| ***B60W 20/20*** | (2016.01) |
| ***B60K 1/02*** | (2006.01) |
| ***B60K 7/00*** | (2006.01) |
| ***H02K 7/00*** | (2006.01) |
| ***B60W 10/08*** | (2006.01) |
| ***B60W 40/08*** | (2012.01) |
| ***B60L 50/60*** | (2019.01) |
| ***B60K 6/40*** | (2007.10) |
| ***B60K 6/442*** | (2007.10) |
| ***B60K 6/52*** | (2007.10) |
| ***B60L 9/18*** | (2006.01) |
| ***B60L 50/61*** | (2019.01) |
| ***B60L 53/24*** | (2019.01) |
| ***B60L 50/40*** | (2019.01) |
| ***B60W 20/10*** | (2016.01) |
| *B60K 6/26* | (2007.10) |

(52) U.S. Cl.

CPC .................. *B60K 6/40* (2013.01); *B60K 6/44* (2013.01); *B60K 6/442* (2013.01); *B60K 6/52* (2013.01); *B60K 7/0007* (2013.01); *B60L 9/18* (2013.01); *B60L 15/20* (2013.01); *B60L 50/16* (2019.02); *B60L 50/40* (2019.02); *B60L 50/60* (2019.02); *B60L 50/61* (2019.02); *B60L 53/24* (2019.02); *B60W 10/08* (2013.01); *B60W 20/10* (2013.01); *B60W 20/20* (2013.01); *B60W 40/08* (2013.01); *H02K 7/006* (2013.01); *B60K 6/26* (2013.01); *B60K 2001/045* (2013.01); *B60K 2001/0405* (2013.01); *B60K 2001/0416* (2013.01); *B60K 2001/0438* (2013.01); *B60K 2007/0092* (2013.01); *B60W 2540/10* (2013.01); *B60Y 2200/92* (2013.01)

(56) References Cited

U.S. PATENT DOCUMENTS

| | | | | |
|---|---|---|---|---|
| 2005/0099155 | A1 | 5/2005 | Okuda et al. | |
| 2006/0097579 | A1 | 5/2006 | Okuda et al. | |
| 2007/0188125 | A1* | 8/2007 | Shepard | B60K 7/0007 318/778 |
| 2008/0197810 | A1 | 8/2008 | Ishikawa et al. | |
| 2009/0088914 | A1* | 4/2009 | Mizutani | B60W 10/119 701/22 |
| 2009/0152030 | A1* | 6/2009 | Palatov | B60K 17/356 180/65.285 |
| 2010/0133023 | A1 | 6/2010 | Tang | |
| 2010/0187024 | A1 | 7/2010 | Tang | |
| 2010/0187905 | A1 | 7/2010 | Tang | |
| 2012/0143426 | A1 | 6/2012 | Yamamoto et al. | |
| 2012/0279793 | A1* | 11/2012 | Kikuchi | B60W 30/18027 180/197 |
| 2014/0084828 | A1 | 3/2014 | Yamamoto | |
| 2014/0368041 | A1 | 12/2014 | Tu et al. | |
| 2015/0210171 | A1 | 7/2015 | King et al. | |
| 2016/0368496 | A1* | 12/2016 | Honda | B62D 11/003 |
| 2017/0008385 | A1* | 1/2017 | Fujimoto | B60K 7/0007 |
| 2018/0065491 | A1 | 3/2018 | King et al. | |
| 2019/0061504 | A1* | 2/2019 | Bassis | B60K 17/356 |
| 2019/0248225 | A1* | 8/2019 | Kawamura | H02K 21/22 |
| 2019/0381897 | A1 | 12/2019 | King et al. | |
| 2020/0021209 | A1* | 1/2020 | Polcuch | H02P 3/14 |
| 2020/0139825 | A1 | 5/2020 | King et al. | |
| 2020/0238817 | A1* | 7/2020 | Yabuta | B60B 27/0052 |
| 2020/0376949 | A1* | 12/2020 | Furukawa | B60K 6/46 |
| 2021/0008971 | A1* | 1/2021 | Toda | B60K 6/442 |
| 2021/0016765 | A1* | 1/2021 | Toda | B60K 6/24 |
| 2021/0070163 | A1* | 3/2021 | Yada | B60B 27/0052 |
| 2021/0300321 | A1* | 9/2021 | Toda | B60L 50/16 |
| 2021/0394606 | A1* | 12/2021 | Furukawa | B60L 50/64 |

FOREIGN PATENT DOCUMENTS

| | | | |
|---|---|---|---|
| JP | 2005-178479 | A | 7/2005 |
| JP | 2005-289182 | A | 10/2005 |
| JP | 2005-289322 | A | 10/2005 |
| JP | 2006-103535 | A | 4/2006 |
| JP | 2006-158173 | A | 6/2006 |
| JP | 2006-264474 | A | 10/2006 |
| JP | 2006-345606 | A | 12/2006 |
| JP | 2009-268343 | A | 11/2009 |
| JP | 2011-031744 | A | 2/2011 |
| JP | 2011-110966 | A | 6/2011 |
| JP | 2011-218914 | A | 11/2011 |
| JP | 2012-066609 | A | 4/2012 |
| JP | 2012-121375 | A | 6/2012 |
| JP | 5280961 | B2 | 9/2013 |
| JP | 2013-219942 | A | 10/2013 |
| JP | 5605877 | B1 | 10/2014 |
| JP | 2015-142508 | A | 8/2015 |
| KR | 10-1551120 | B1 | 9/2015 |
| WO | 2004/066472 | A1 | 8/2004 |
| WO | 2012/157036 | A1 | 11/2012 |

OTHER PUBLICATIONS

International Search Report and Written Opinion dated Jun. 11, 2019 for PCT/JP2019/011428 filed on Mar. 19, 2019, 11 pages including English Translation of the International Search Report.

Office Action dated Aug. 18, 2021, in corresponding Japanese patent Application No. 2018-158419, 13 pages.

Office Action dated Mar. 28, 2022, in corresponding Japanese patent Application No. 2018-228129, 6 pages.

Office Action dated Mar. 7, 2022, in corresponding Japanese patent Application No. 2018-143355, 7 pages.

Office Action dated Mar. 7, 2022, in corresponding Japanese patent Application No. 2018-143356, 7 pages.

Office Action dated Mar. 7, 2022, in corresponding Japanese patent Application No. 2018-143357, 7 pages.

* cited by examiner 1
10
2a
2a
2b
2b
14c
14b
18
48V LIB
3.5kWh
12V ELECTRIC COMPONENTS OF VEHICLE
14a
14
25kW 48V P1Motor
INV
16a
16
12
24
17kW × 2
P4 motor
22
20a
20a
INV
CAP
INV
20
20
26a
HIGH VOLTAGE DCDC
CHARGE
LOW VOLTAGE DCDC
INTEGRATED UNIT
26b

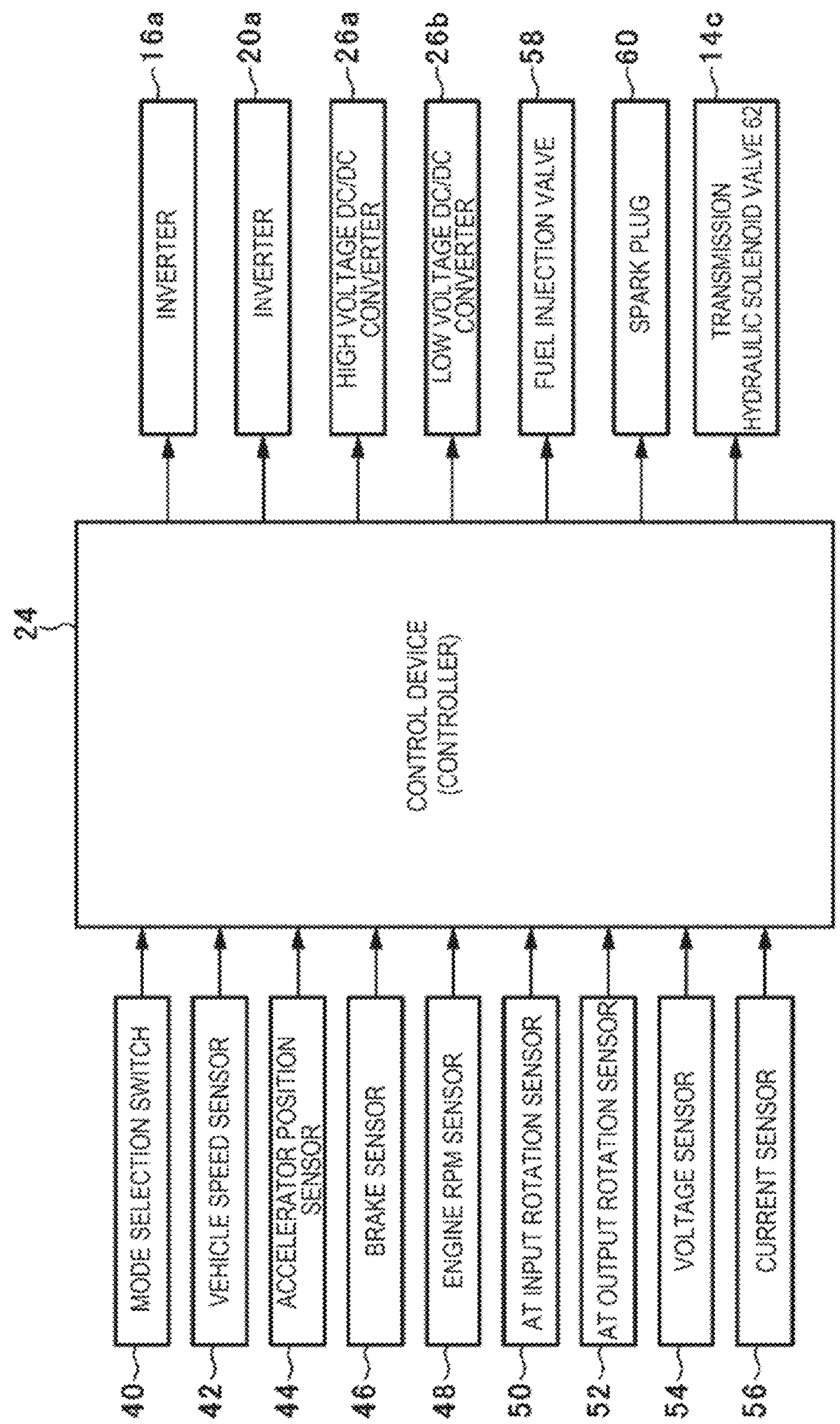
FIG. 5
24
CONTROL DEVICE (CONTROLLER)
40
MODE SELECTION SWITCH
42
VEHICLE SPEED SENSOR
44
ACCELERATOR POSITION SENSOR
46
BRAKE SENSOR
48
ENGINE RPM SENSOR
50
AT INPUT ROTATION SENSOR
52
AT OUTPUT ROTATION SENSOR
54
VOLTAGE SENSOR
56
CURRENT SENSOR
16a
INVERTER
20a
INVERTER
26a
HIGH VOLTAGE DC/DC CONVERTER
26b
LOW VOLTAGE DC/DC CONVERTER
58
FUEL INJECTION VALVE
60
SPARK PLUG
14c
TRANSMISSION HYDRAULIC SOLENOID VALVE 62

25
ELECTRIC COMPONENTS
24
26b
LOW VOLTAGE DC/DC CONVERTER
16a
INVERTER
C-ISG
16
48V
26a
HIGH VOLTAGE DC/DC CONVERTER
18
22
20a
INVERTER
20
AUXILIARY DRIVE MOTOR
20a
INVERTER
20
AUXILIARY DRIVE MOTOR

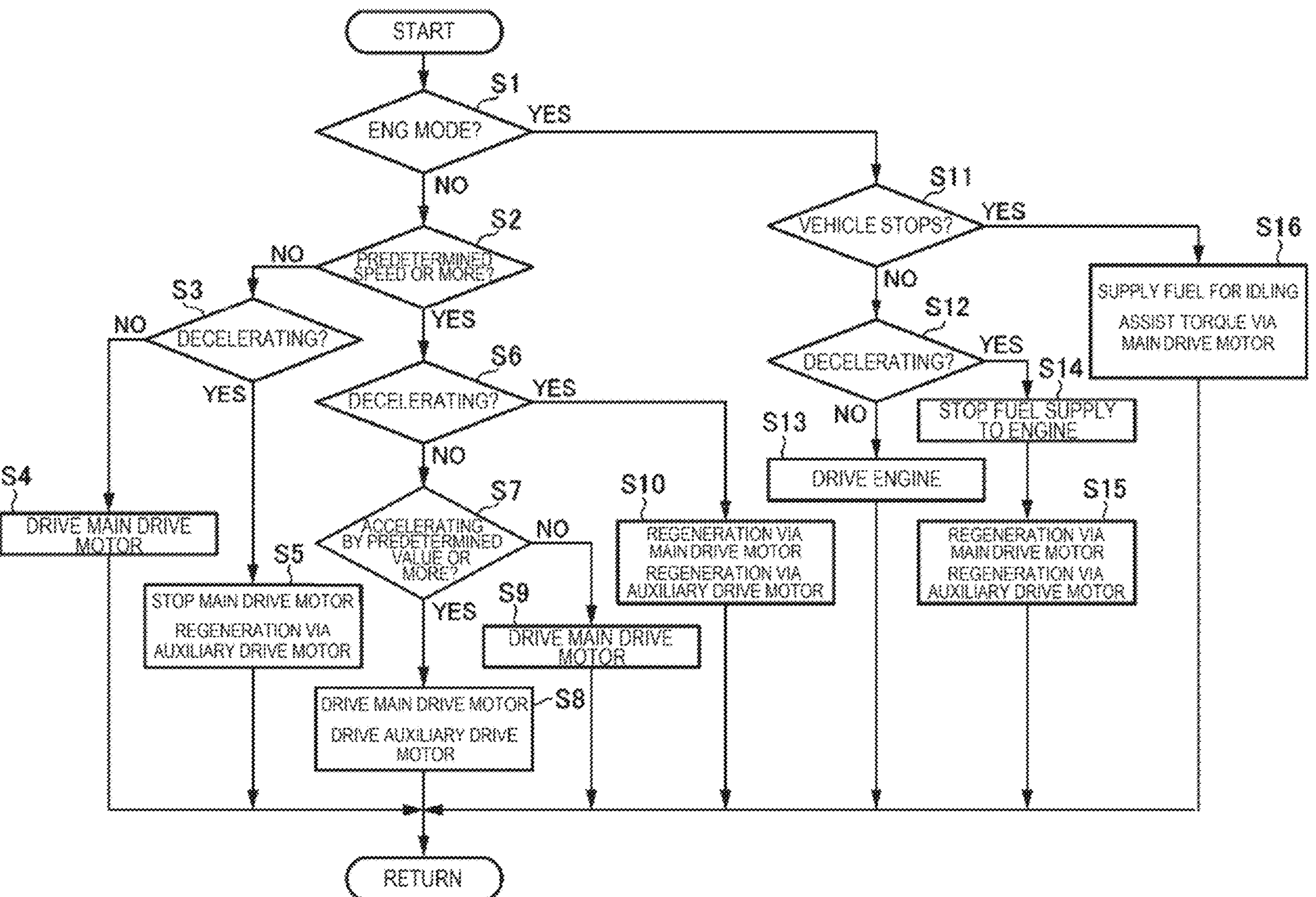
FIG. 10
START
S1
ENG MODE?
YES
NO
S2
PREDETERMINED SPEED OR MORE?
YES
NO
S3
DECELERATING?
YES
NO
S4
DRIVE MAIN DRIVE MOTOR
S5
STOP MAIN DRIVE MOTOR
REGENERATION VIA AUXILIARY DRIVE MOTOR
S6
DECELERATING?
YES
NO
S7
ACCELERATING BY PREDETERMINED VALUE OR MORE?
YES
NO
S8
DRIVE MAIN DRIVE MOTOR
DRIVE AUXILIARY DRIVE MOTOR
S9
DRIVE MAIN DRIVE MOTOR
S10
REGENERATION VIA MAIN DRIVE MOTOR
REGENERATION VIA AUXILIARY DRIVE MOTOR
S11
VEHICLE STOPS?
YES
NO
S12
DECELERATING?
YES
NO
S13
DRIVE ENGINE
S14
STOP FUEL SUPPLY TO ENGINE
S15
REGENERATION VIA MAIN DRIVE MOTOR
REGENERATION VIA AUXILIARY DRIVE MOTOR
S16
SUPPLY FUEL FOR IDLING
ASSIST TORQUE VIA MAIN DRIVE MOTOR
RETURN

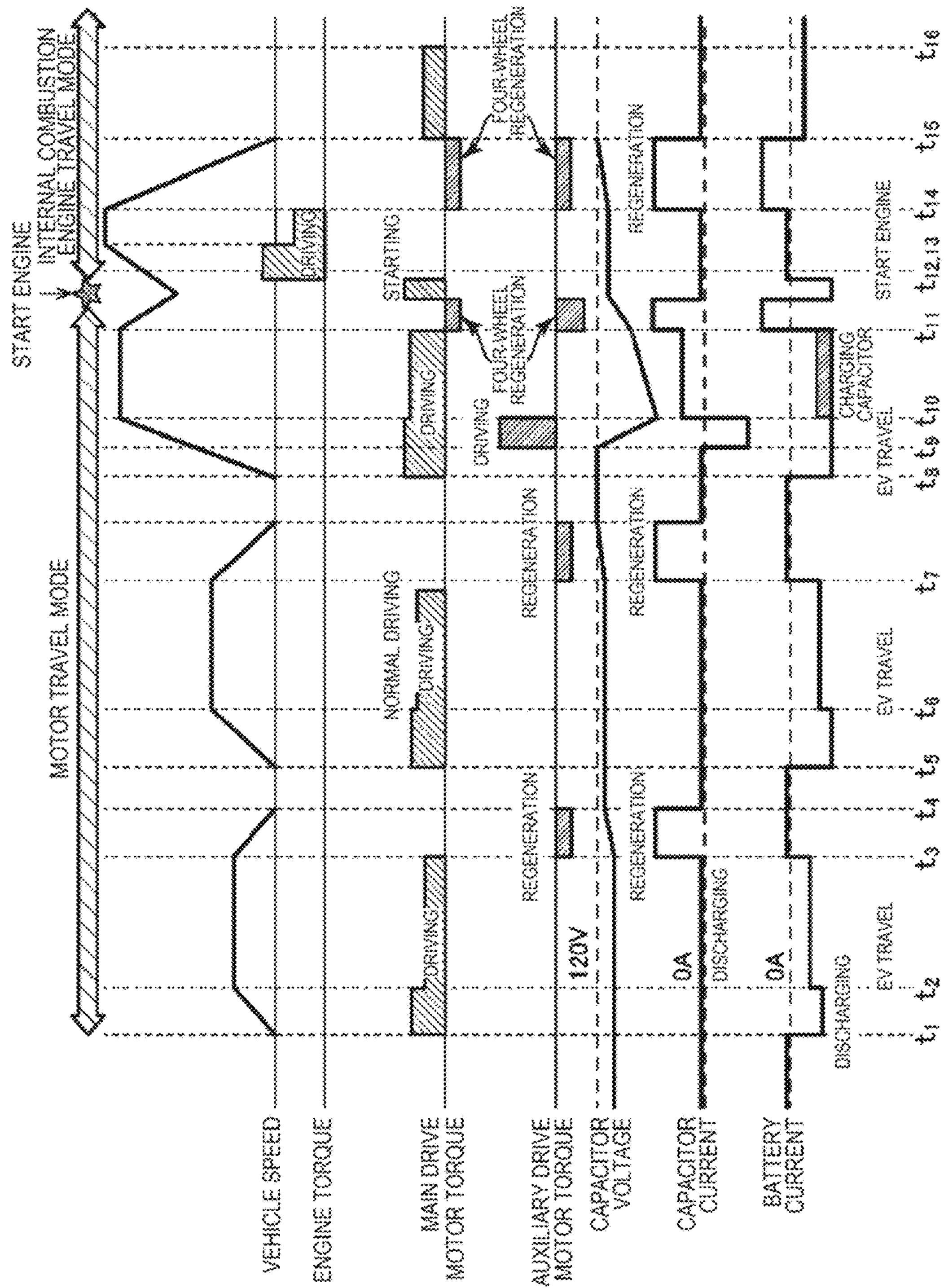
FIG. 11
VEHICLE SPEED
ENGINE TORQUE
MAIN DRIVE MOTOR TORQUE
AUXILIARY DRIVE MOTOR TORQUE
CAPACITOR VOLTAGE
CAPACITOR CURRENT
BATTERY CURRENT
MOTOR TRAVEL MODE
START ENGINE
INTERNAL COMBUSTION ENGINE TRAVEL MODE
DRIVING
NORMAL DRIVING
STARTING
REGENERATION
FOUR-WHEEL REGENERATION
120V
0A
DISCHARGING
EV TRAVEL
CHARGING CAPACITOR
START ENGINE
$t_1$ $t_2$ $t_3$ $t_4$ $t_5$ $t_6$ $t_7$ $t_8$ $t_9$ $t_{10}$ $t_{11}$ $t_{12,13}$ $t_{14}$ $t_{15}$ $t_{16}$

FIG.12

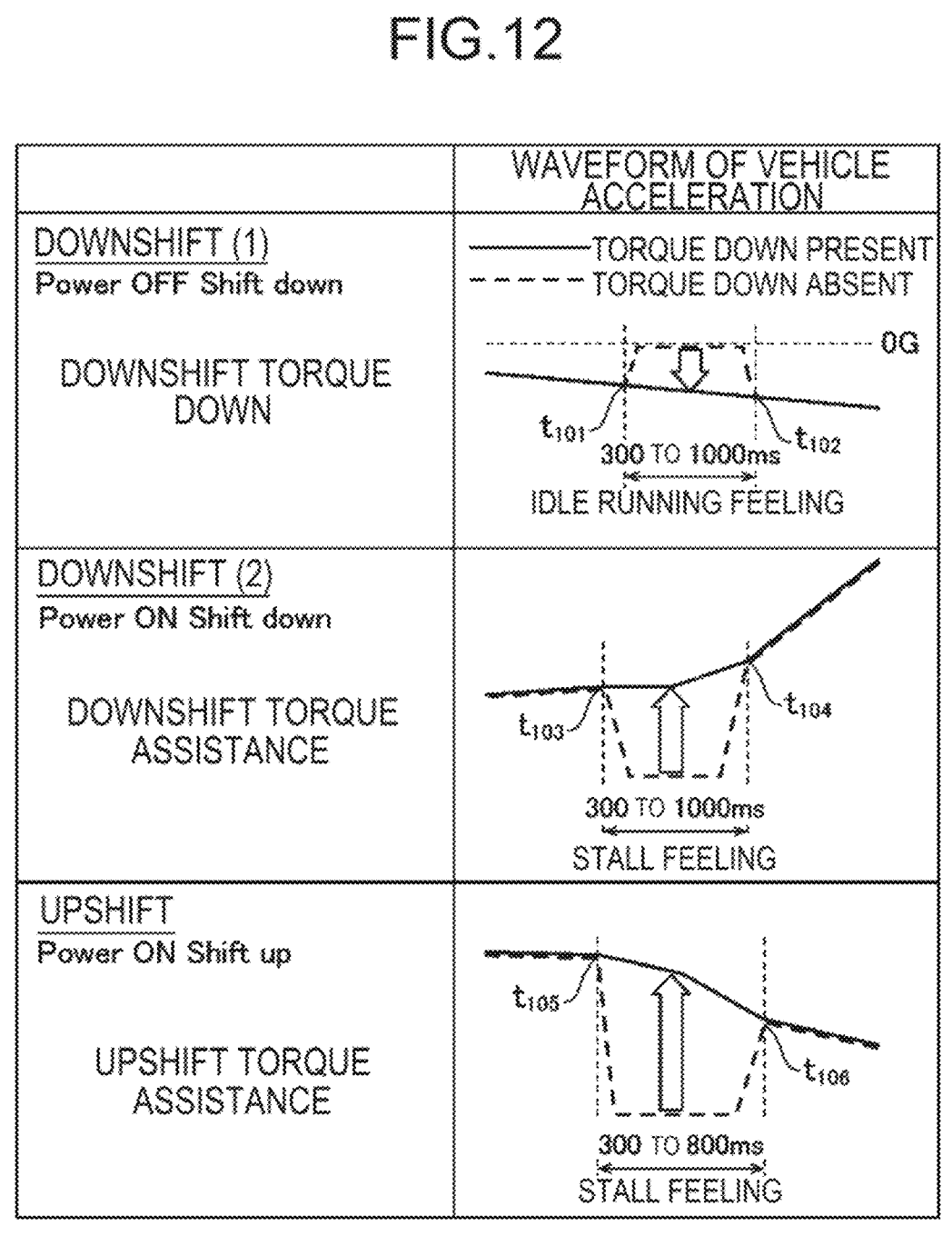

| | WAVEFORM OF VEHICLE ACCELERATION |
|---|---|
| DOWNSHIFT (1)<br>Power OFF Shift down<br>DOWNSHIFT TORQUE DOWN | TORQUE DOWN PRESENT<br>TORQUE DOWN ABSENT<br>0G<br>$t_{101}$<br>$t_{102}$<br>300 TO 1000ms<br>IDLE RUNNING FEELING |
| DOWNSHIFT (2)<br>Power ON Shift down<br>DOWNSHIFT TORQUE ASSISTANCE | $t_{103}$<br>$t_{104}$<br>300 TO 1000ms<br>STALL FEELING |
| UPSHIFT<br>Power ON Shift up<br>UPSHIFT TORQUE ASSISTANCE | $t_{105}$<br>$t_{106}$<br>300 TO 800ms<br>STALL FEELING |

101
102b
20
20a
22
20a
INV
CAP
INV
HIGH VOLTAGE DCDC
CHARGE
LOW VOLTAGE DCDC
26a
26b
18
Li Ion Battery
16a
INV
102a
M/G
T/M
12
16
14c 201
202b
202b
20a
22
20a
INV
CAP
INV
HIGH VOLTAGE DCDC
CHARGE
LOW VOLTAGE DCDC
26a
26b
18
Li Ion Battery
16a
INV
202a
202a
20
20
M/G
T/M
12
16
14c 301
302b
302b
20
20
14c
14b
18
Li Ion
Battery
14a
INV
16a
16
12
302a
302a
22
INV
CAP
INV
20a
20a
HIGH
VOLTAGE
DCDC
CHARGE
LOW
VOLTAGE
DCDC
26a
26b

VEHICLE DRIVE DEVICE

CROSS-REFERENCE TO RELATED APPLICATIONS

The present application is based on PCT filing PCT/JP2019/011428, filed Mar. 19, 2019, which claims priority to JP 2018-052636, filed Mar. 20, 2018, and JP 2018-143355, filed Jul. 31, 2018, the entire contents of each are incorporated herein by reference.

TECHNICAL FIELD

The present invention relates to a vehicle drive device and, more particularly, to a vehicle drive device that uses in-wheel motors to drive a vehicle.

BACKGROUND ART

In recent years, exhaust gas regulations for vehicles have been enhanced and demands for fuel efficiency and carbon dioxide emissions per travel distance for vehicles have become strict in various countries in the world. In addition, some cities regulate entry of vehicles traveling by an internal combustion engine into urban areas. To satisfy these requests, hybrid-drive vehicles having an internal combustion engine and motors and electric vehicles driven only by motors have been developed and widely used.

Japanese Patent No. 5280961 (PTL 1) describes a drive control device for vehicles. In this drive control device, a drive device is provided on the rear wheel side of the vehicle and two motors provided in this drive device drive the rear wheels of the vehicle, respectively. In addition to this drive device, a drive unit formed by connecting an internal combustion engine and a motor that are in series is provided in the front portion of the vehicle. The power of the drive unit is transmitted to the front wheels via the transmission and the main drive shaft and the power of the drive device is transmitted to the rear wheels of the vehicle. In addition, in this drive control device, the two motors of the drive device are driven when the vehicle starts, and these driving forces are transmitted to the rear wheels of the vehicle, respectively. In addition, the driving unit also generates a driving force during acceleration of the vehicle and the four-wheel drive is achieved by the driving unit and the two motors of the drive device. As described above, in the drive control device described in PTL 1, the two motors provided mainly for the rear wheels of the vehicle generate the driving forces.

CITATION LIST

Patent Literature

PTL 1: Japanese Patent No. 5280961

SUMMARY OF INVENTION

Technical Problem

Since the driving of a vehicle by motors does not emit carbon dioxide during a travel, emission regulations that are enhanced each year can be advantageously satisfied, but it is difficult to ensure a sufficiently long distance travel because the electric power that can be stored in the battery is limited. Accordingly, a hybrid drive device having an internal combustion engine together with motors is widely used as a drive device for vehicles. In addition, even in such a hybrid drive device, in order to reduce carbon dioxide emissions during a travel, vehicles that mainly utilize the driving forces of motors like the vehicle described in PTL 1 are increasing.

Such a hybrid drive device driven mainly by the driving forces of motors as described above needs to have a large capacity battery to obtain sufficient travel performance. In addition, in order to obtain a sufficient driving forces by motors, the motors need to be operated at a relatively high voltage. Accordingly, in a hybrid drive device driven mainly by the driving forces of motors, since a large capacity battery is necessary and the electrical system that supplies a high voltage to the motors needs to be electrically insulated sufficiently, the overall weight of the vehicle increases and the fuel efficiency of the vehicle reduces. Furthermore, in order to drive the vehicle with a heavy weight by the motors, a larger capacity battery and a higher voltage are required, thereby causing a vicious cycle that further increases the weight.

In addition, in the drive control device of the vehicle described in PTL 1, the motors that drive the rear wheels are directly connected to the drive shafts of the rear wheels, but the motors may be built into the rear wheels to form so-called in-wheel motors. Since the drive shafts that couple the motors and the wheels are not required when using in-wheel motors, it is advantageous in that the weight of the drive shafts can be reduced. However, even when the in-wheel motors are adopted as the motors for startup, acceleration, and cruise travel of the vehicle as in the invention described in PTL 1, an increase in weight cannot be avoided because large motors are required to obtain sufficient travel performance. Accordingly, the advantage of using in-wheel motors cannot be obtained sufficiently.

Accordingly, an object of the present invention is to provide a vehicle drive device capable of efficiently driving a vehicle by using in-wheel motors without falling into the vicious cycle between enhancement of driving by motors and an increase in vehicle weight.

Solution to Problem

To solve the problem described above, according to the present invention, there is provided a vehicle drive device that uses an in-wheel motor to drive a vehicle, the vehicle drive device including an in-wheel motor that is provided in a wheel of the vehicle and drives the wheel, in which the in-wheel motor generates maximum output power in a high revolutions range equal to or more than a predetermined number of revolutions that is more than zero.

In the present invention configured as described above, the in-wheel motor is provided in the wheel of the vehicle and drives the wheel. This in-wheel motor generates the maximum output power in the high revolutions range equal to or more than the predetermined number of revolutions that is more than zero.

In the present invention configured as described above, the in-wheel motor generates the maximum output power in the high revolutions range equal to or more than the predetermined number of revolutions. Accordingly, by using the driving force of an internal combustion engine or other motor for a travel requested for output power in the low revolutions range such as, for example, starting or a low speed travel and using the in-wheel motor for a travel requested for output power in the high revolutions range such as a high speed travel, the vehicle can be efficiently driven by using a small in-wheel motor.

In the present invention, preferably, the in-wheel motor is an induction motor. Generally, an induction motor can obtain a large output torque in the high revolutions range and can be made lightweight. Accordingly, for example, by using the in-wheel motor so as to be requested for large output power in the high revolutions range and adopting an induction motor as the in-wheel motor, the motor capable of generating sufficient output power in a required revolutions range can be made lightweight.

In the present invention, preferably, the in-wheel motor directly drives the wheel in which the in-wheel motor is provided, without intervention of a deceleration mechanism.

For example, by using the in-wheel motor so that large output power is requested in the high revolutions range, the in-wheel motor can generate sufficient output power in the rotation range in which high output power is requested, without providing a deceleration mechanism. In addition, in the present invention configured as described above, since the wheel is directly driven without intervention of a deceleration mechanism, the deceleration mechanism with very large weight can be omitted and an output loss due to the rotation resistance of the deceleration mechanism can be avoided.

In the present invention, preferably, the vehicle drive device further includes a body side motor that is provided in a body of the vehicle and drives the wheel of the vehicle, in which the body side motor generates maximum output power in a low revolutions range less than the predetermined number of revolutions.

In the present invention configured as described above, the body side motor is provided in the body of the vehicle and this body side motor generates the maximum output in the low revolutions range less than the predetermined number of revolutions. Accordingly, since the body side motor can efficiently drive the vehicle in the low revolutions range in which the in-wheel motor cannot generate high output power, the vehicle can be efficiently driven in any rotation range.

In the present invention, preferably, the body side motor is a permanent magnet motor.

Generally, a permanent magnet motor has a relatively large starting torque and can obtain large output power in the low rotation range. Accordingly, by adopting a permanent magnet motor as the body side motor that is requested for a large torque in the low rotation range in the present invention, the motor capable of generating a sufficient torque in the required rotation range can be made lightweight.

In the present invention, preferably, the vehicle drive device further includes a body side motor that is provided in a body of the vehicle and drives the wheel of the vehicle; and a battery and a capacitor that supply electric power for driving the body side motor and/or the in-wheel motor, in which a voltage of the battery is applied to the body side motor and a voltage of the battery and the capacitor that are connected in series is applied to the in-wheel motor.

In the present invention configured as described above, since the voltage of the battery and the capacitor connected in series is applied to the in-wheel motor, the in-wheel motor can be driven by a high voltage while using the battery of a relatively low voltage.

In addition, according to the present invention, there is provided an in-wheel motor that is provided in a wheel of the vehicle and drives the wheel, in which the in-wheel motor generates maximum output power in a high vehicle speed range equal to or more than a predetermined vehicle speed that is more than zero.

Advantageous Effects of Invention

The vehicle drive device according to the present invention can efficiently drive a vehicle using an in-wheel motor without causing the vicious cycle between enhancement of driving by a motor and an increase in vehicle weight.

BRIEF DESCRIPTION OF DRAWINGS

FIG. 5 is a block diagram illustrating the inputs and outputs of various signals in the hybrid drive device according to the first embodiment of the present invention.

FIG. 10 is a flowchart illustrating control by a control device of the hybrid drive device according to the first embodiment of the present invention.

FIG. 11 is a graph illustrating examples of operations in individual modes of the hybrid drive device according to the first embodiment of the present invention.

FIG. 12 is a diagram schematically illustrating changes in the acceleration acting on the vehicle when a transmission downshifts or upshifts in the hybrid drive device according to the first embodiment of the present invention.

DESCRIPTION OF EMBODIMENTS

Next, preferred embodiments of the present invention will be described with reference to the attached drawings.

Figure 1:
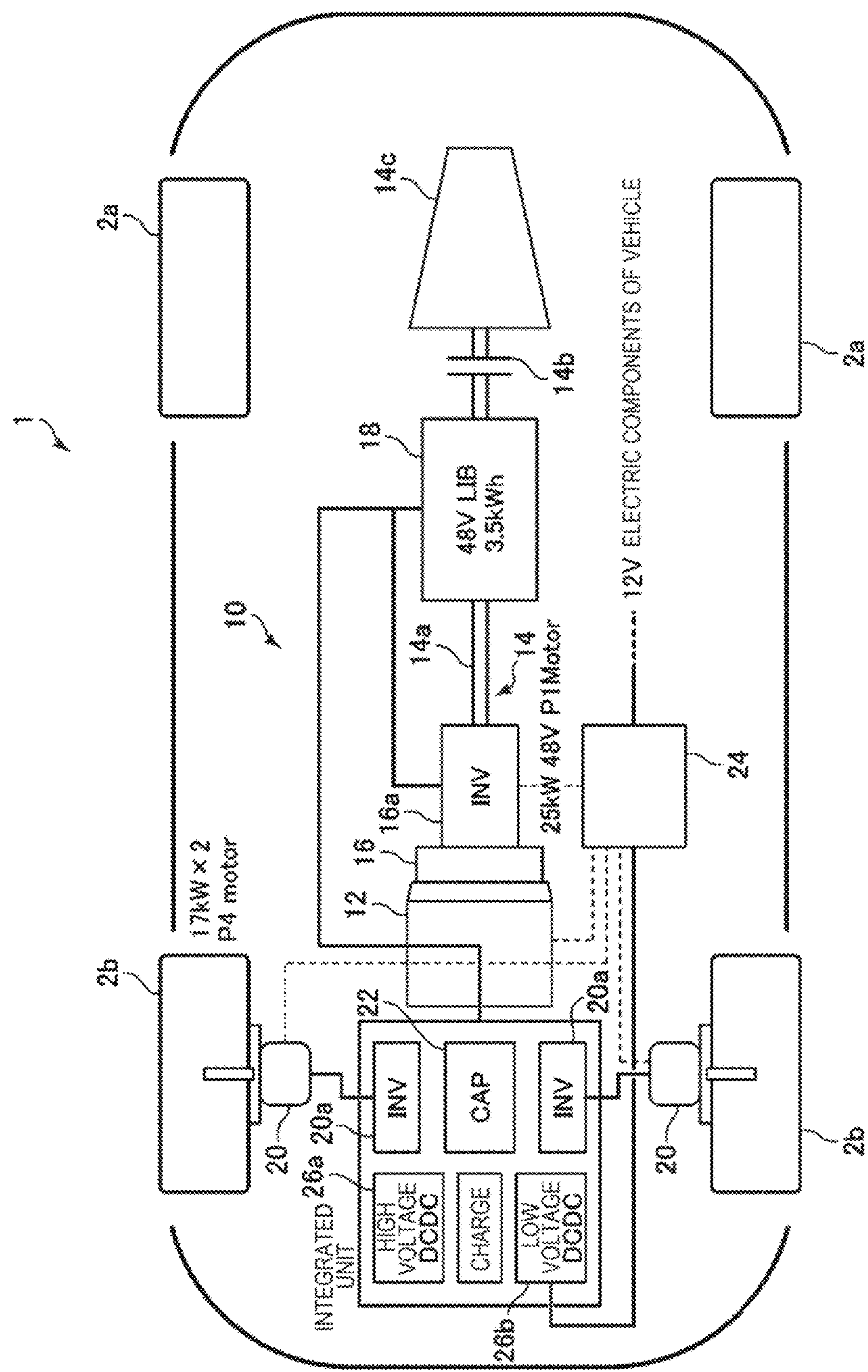
FIG. 1 is a layout diagram illustrating a vehicle in which a hybrid drive device according to a first embodiment of the present invention is installed.
Figure 2:
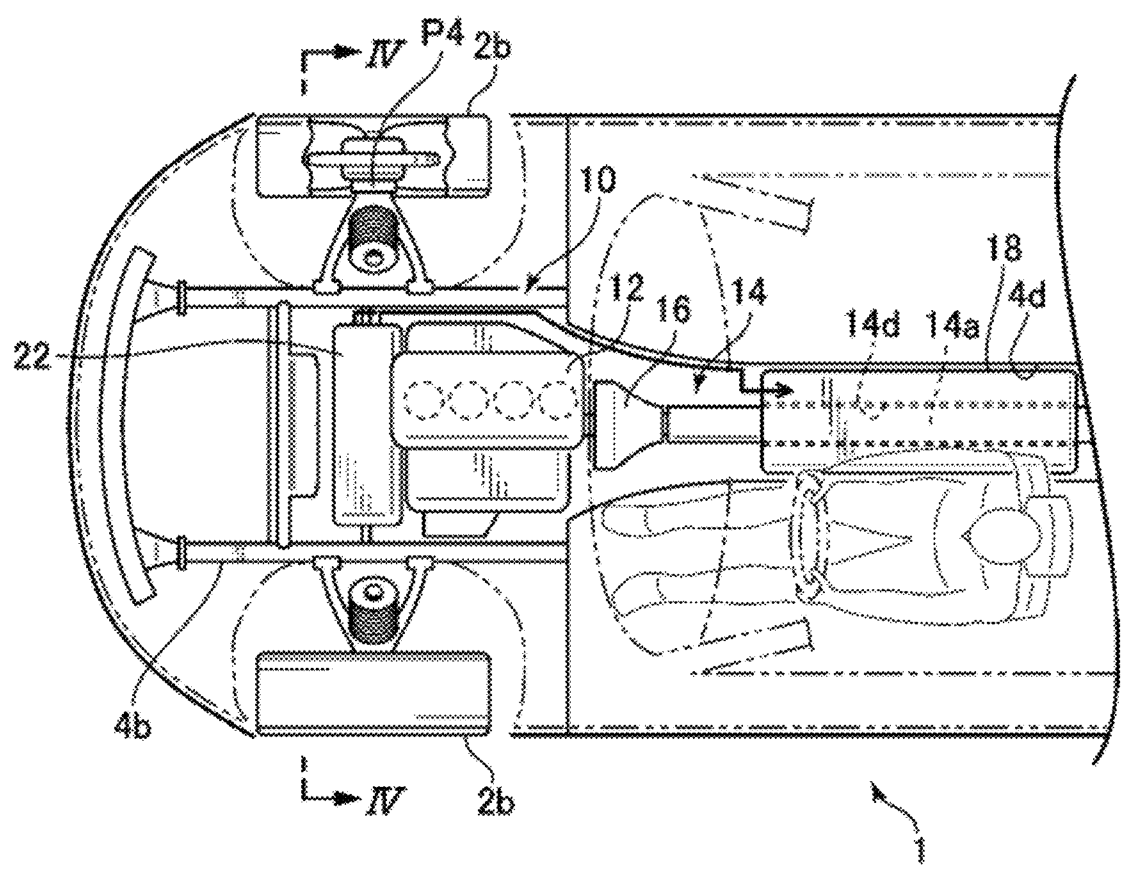
FIG. 2 is a perspective view, as seen from above, illustrating a front portion of the vehicle in which the hybrid drive device according to the first embodiment of the present invention is installed.
Figure 3:
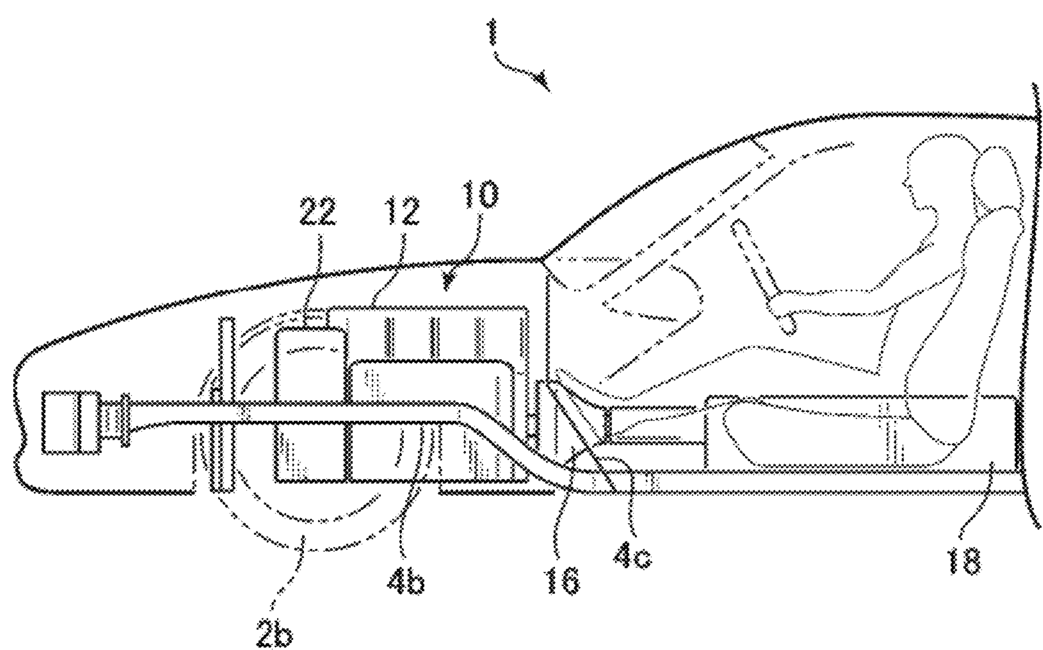
FIG. 3 is a perspective view, as seen from the side, illustrating the front portion of the vehicle in which the hybrid drive device according to the first embodiment of the present invention is installed.
Figure 4:
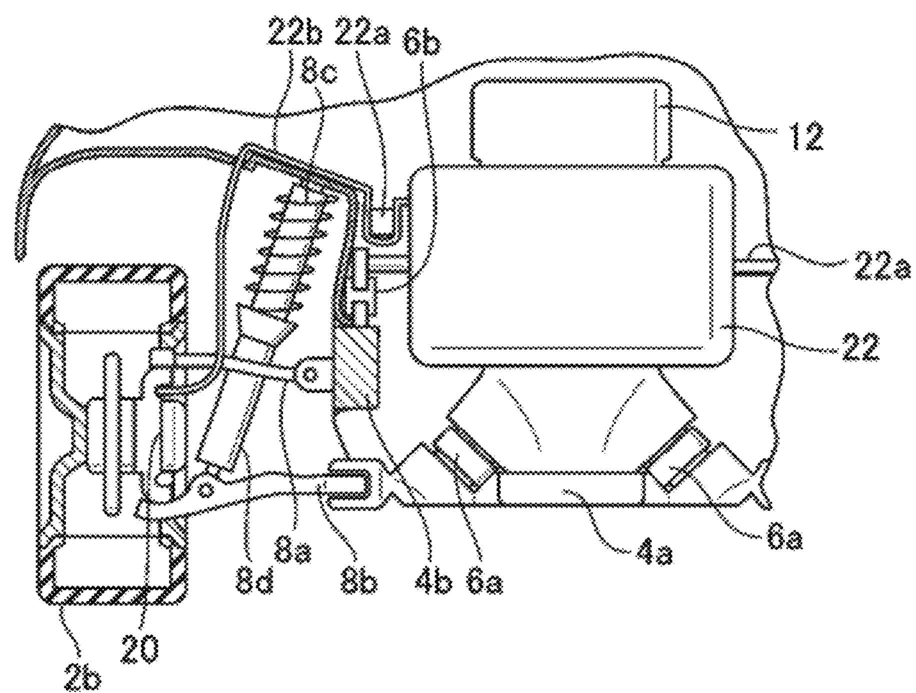
FIG. 4 is a sectional view taken along line iv-iv in FIG. 2.

FIG. 1 is a layout diagram illustrating a vehicle in which a hybrid drive device according to a first embodiment of the present invention is installed. FIG. 2 is a perspective view, as seen from the side, illustrating the front portion of a vehicle in which the hybrid drive device according to the embodiment is installed and FIG. 3 is a perspective view, as seen from the side, illustrating the front portion of the vehicle. FIG. 4 is a sectional view taken along line iv-iv in FIG. 2.

As illustrated in FIG. 1, a vehicle 1 having the hybrid drive system, which is a vehicle drive device according to the first embodiment of the present invention, is a so-called FR (front engine rear drive) vehicle in which an engine 12 as an internal combustion engine is installed in the front portion (in front of the driver's seat) of the vehicle and a pair of left and right rear wheels 2*a* as main drive wheels is driven. In addition, as described later, the rear wheels 2*a* are also driven by the main drive motor, which is the main drive electric motor, and a pair of left and right front wheels 2*b*, which are auxiliary drive wheels, is driven by the auxiliary drive motors, which are the auxiliary drive electric motors.

A hybrid drive device 10 according to the first embodiment of the present invention installed in the vehicle 1 includes the engine 12 that drives the rear wheels 2*a*, a power transmission mechanism 14 that transmits a driving force to the rear wheels 2*a*, a main drive motor 16 that drives the rear wheels 2*a*, a battery 18 that is an electric storage unit, auxiliary drive motors 20 that drive the front wheels 2*b*, a capacitor 22, and a control device 24 that is a controller.

The engine 12 is an internal combustion engine for generating a driving force for the rear wheels 2*a*, which are the main drive wheels of the vehicle 1. As illustrated in FIGS. 2 to 4, in the embodiment, an in-line 4-cylinder engine is adopted as the engine 12 and the engine 12 disposed in the front portion of the vehicle 1 drives the rear wheels 2*a* via the power transmission mechanism 14. In addition, as illustrated in FIG. 4, in the embodiment, the engine 12 is a flywheel-less engine that does not include a flywheel and installed on a subframe 4*a* of the vehicle 1 via engine mounts 6*a*. Furthermore, the sub-frame 4*a* is fastened and fixed to the lower portions of front side frames 4*b* and the lower portion of a dash panel 4*c* at the rear ends thereof.

The power transmission mechanism 14 is configured to transmit the driving force generated by the engine 12 to the rear wheels 2*a*, which are the main drive wheels. As illustrated in FIG. 1 to FIG. 3, the power transmission mechanism 14 includes a propeller shaft 14*a* connected to the engine 12, a clutch 14*b*, and a transmission 14*c*, which is a stepped transmission. The propeller shaft 14*a* extends from the engine 12 disposed in the front portion of the vehicle 1 toward the rear of the vehicle 1 in a propeller shaft tunnel 4*d* (FIG. 2). The rear end of the propeller shaft 14*a* is connected to the transmission 14*c* via the clutch 14*b*. The output shaft of the transmission 14*c* is connected to the axle shaft (not illustrated) of the rear wheels 2*a* and drives the rear wheels 2*a*.

In the embodiment, the transmission 14*c* is provided in so-called transaxle arrangement. As a result, since the main body of the transmission with a large outer diameter is not present immediately behind the engine 12, the width of the floor tunnel (propeller shaft tunnel 4*d*) can be reduced, the foot space in the middle of the occupant can be obtained, and the lower body of the occupant can take a symmetrical posture that faces directly the front. Furthermore, the outer diameter and the length of the main drive motor 16 can easily have sufficient sizes according to the output power thereof while keeping this posture of the occupant.

The main drive motor 16 is an electric motor for generating a driving force for the main drive wheels, provided on the body of the vehicle 1, disposed behind the engine 12 adjacently to the engine 12, and functions as a body side motor. In addition, an inverter (INV) 16*a* is disposed adjacently to the main drive motor 16 and the inverter 16*a* converts the current from the battery 18 into alternating current and supplies the alternating current to the main drive motor 16. Furthermore, as illustrated in FIG. 2 and FIG. 3, the main drive motor 16 is connected in series to the engine 12 and the driving force generated by the main drive motor 16 is also transmitted to the rear wheels 2*a* via the power transmission mechanism 14. Alternatively, the present invention may be configured so that the driving force is transmitted to the rear wheels 2*a* via a part of the power transmission mechanism 14 by connecting the main drive motor 16 to an intermediate point of the power transmission mechanism 14. In addition, the embodiment adopts, as the main drive motor 16, a 25 kW permanent magnet motor (permanent magnet synchronous motor) driven by 48 V.

The battery 18 is an electric storage unit that stores electric power for mainly operating the main drive motor 16. In addition, as illustrated in FIG. 2, the battery 18 is disposed inside the propeller shaft tunnel 4*d* so as to surround the torque tube 14*d* that covers the propeller shaft 14*a* in the embodiment. Furthermore, in the embodiment, a 48 V 3.5 kWh lithium ion battery (LIB) is used as the battery 18.

Since the transaxle arrangement is adopted in the embodiment as described above, the volume for accommodating the battery 18 can be expanded toward the space in front of the floor tunnel (propeller shaft tunnel 4*d*) created by this arrangement. This can obtain and expand the capacity of the battery 18 without reducing the space in the middle of the occupant by increasing the width of the floor tunnel.

As illustrated in FIG. 4, the auxiliary drive motors 20 are provided in the front wheels 2*b* under the springs of the vehicle 1 so as to generate driving forces for the front wheels 2*b*, which are the auxiliary drive wheels. In the embodiment, the front wheel 2*b* is supported by a double wishbone type suspension and is suspended by an upper arm 8*a*, a lower arm 8*b*, a spring 8*c*, and a shock absorber 8*d*. The auxiliary drive motors 20 are in-wheel motors and are housed in the wheels of the front wheels 2*b*. Accordingly, the auxiliary drive motors 20 are provided in the so-called "under-spring portions" of the vehicle 1 so as to drive the front wheels 2*b*. In addition, as illustrated in FIG. 1, the current from the capacitor (CAP) 22 is converted into alternating current by inverters 20*a* and supplied to the auxiliary drive motors 20. Furthermore, in the embodiment, the auxiliary drive motors 20 are not provided with deceleration machines that are deceleration mechanisms, the driving forces of the auxiliary drive motors 20 are directly transmitted to the front wheels 2*b*, and the wheels are directly driven. In addition, in the embodiment, 17 kW induction motors are adopted as the auxiliary drive motors 20.

The capacitor (CAP) 22 is provided so as to store the electric power regenerated by the auxiliary drive motors 20. As illustrated in FIG. 2 and FIG. 3, the capacitor 22 is disposed immediately in front of the engine 12 and supplies electric power to the auxiliary drive motors 20 provided in the front wheels 2*b* of the vehicle 1. As illustrated in FIG. 4, in the capacitor 22, brackets 22*a* projecting from both side surfaces thereof are supported by the front side frames 4*b* via a capacitor mount 6*b*. In addition, a harness 22*b* extending from the auxiliary drive motor 20 to the capacitor 22 passes through the upper end of the side wall of the wheel house and is led to the engine room. In addition, the capacitor 22 is configured to store electric charge at a voltage higher than in the battery 18 and is disposed in a region between the left and right front wheels 2*b*, which are the auxiliary drive wheels. The auxiliary drive motors 20, which are driven mainly by the electric power stored in the capacitor 22, are driven by a voltage higher than in the main drive motor 16.

The control device 24 controls the engine 12, the main drive motor 16, and the auxiliary drive motors 20 to execute a motor travel mode and an internal combustion engine travel mode. Specifically, the control device 24 can include a microprocessor, a memory, an interface circuit, a program for operating these components (these components are not illustrated), and the like. Details on control by the control device 24 will be described later.

In addition, as illustrated in FIG. 1, a high voltage DC/DC converter 26*a* and a low voltage DC/DC converter 26*b*, which are voltage converting units, are disposed near the capacitor 22. The high voltage DC/DC converter 26*a*, the low voltage DC/DC converter 26*b*, the capacitor 22, and the two inverters 20*a* are unitized to form an integrated unit.

Next, the overall structure, the power supply structure, and the driving of the vehicle 1 by the individual motors in the hybrid drive device 10 according to the first embodiment of the present invention will be described with reference to FIG. 5 to FIG. 8.

Figure 6:
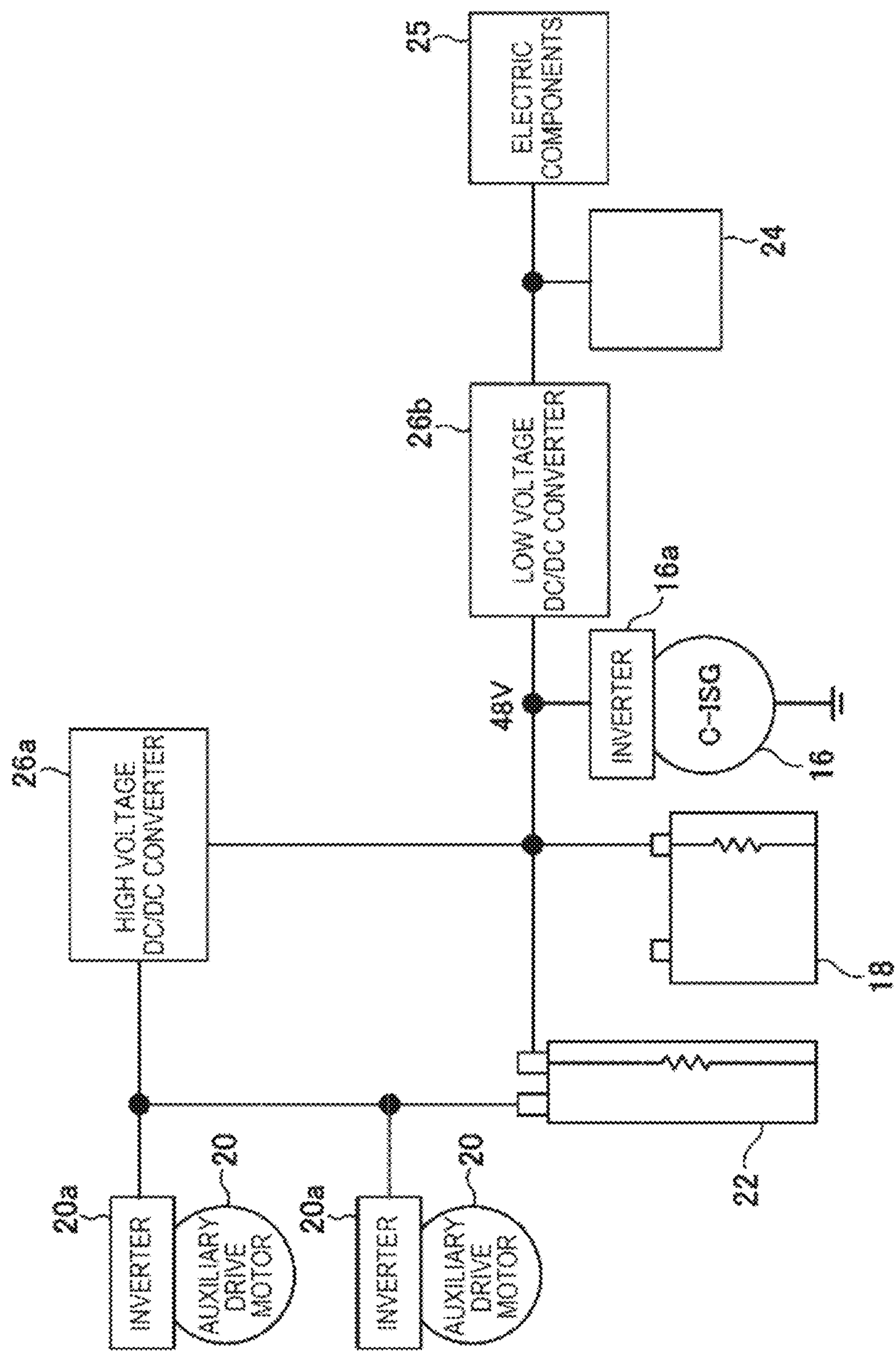
FIG. 6 is a block diagram illustrating the power supply structure of the hybrid drive device according to the first embodiment of the present invention.
Figure 7:
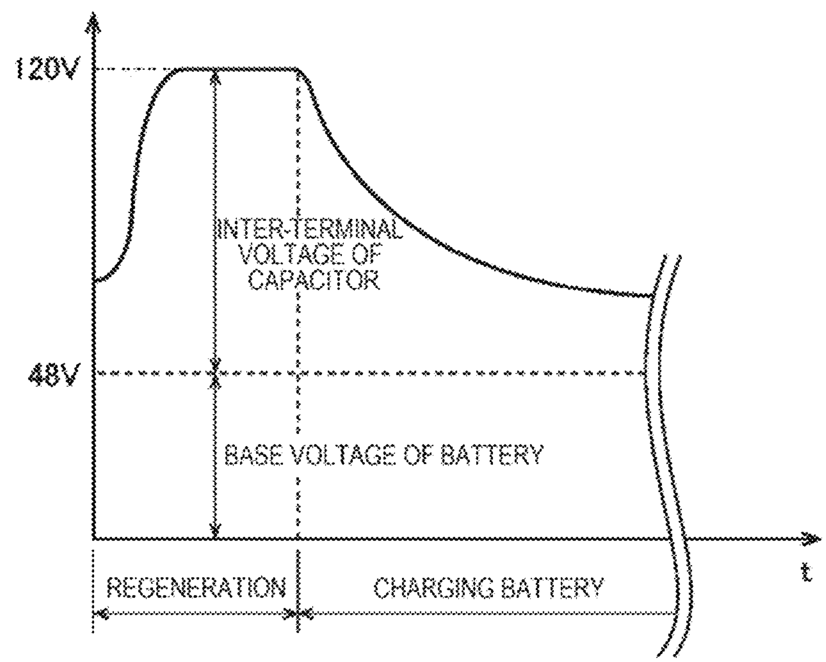
FIG. 7 is a diagram schematically illustrating one example of changes in voltages when electric power is regenerated into a capacitor in the hybrid drive device according to the first embodiment of the present invention.
Figure 8:
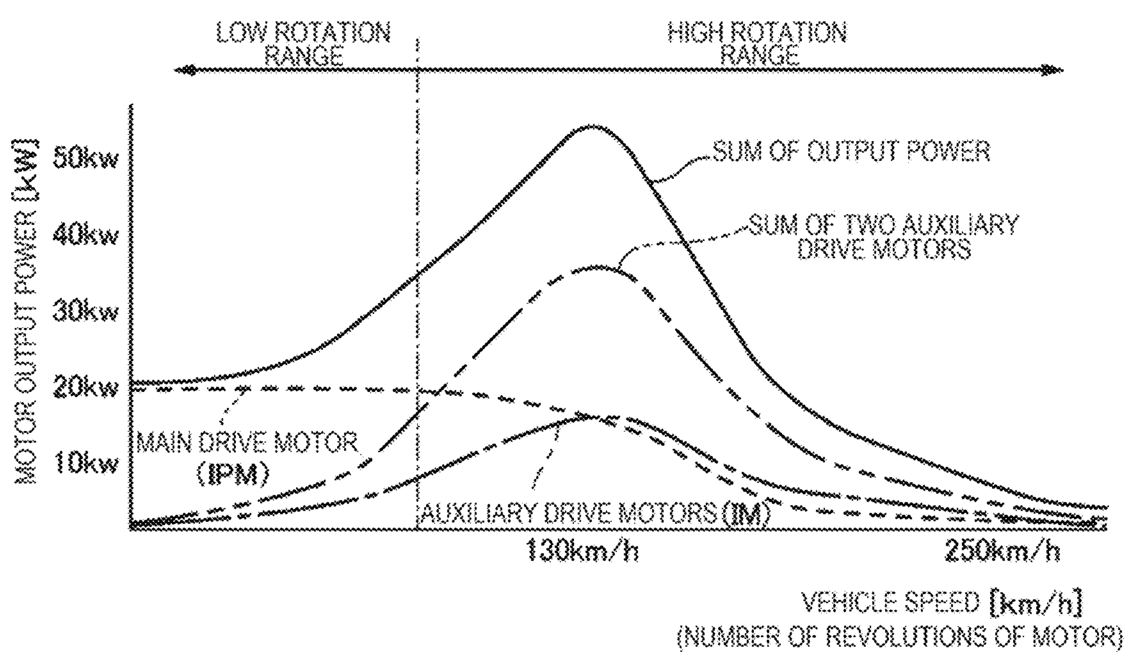
FIG. 8 is a diagram illustrating the relationship between the output power and the vehicle speed of individual motors used in the hybrid drive device according to the first embodiment of the present invention.

FIG. 5 is a block diagram illustrating the inputs and outputs of various signals in the hybrid drive device 10 according to the first embodiment of the present invention. FIG. 6 is a block diagram illustrating the power supply structure of the hybrid drive device 10 according to the first embodiment of the present invention. FIG. 7 is a diagram schematically illustrating one example of changes in voltages when electric power is regenerated into the capacitor 22 in the hybrid drive device 10 according to the embodiment. FIG. 8 is a diagram illustrating the relationship between the output power of the motors used in the hybrid drive device 10 according to the embodiment and the vehicle speed.

First, the inputs and outputs of various signals in the hybrid drive device 10 according to the first embodiment of the present invention will be described. As illustrated in FIG. 5, the control device 24 receives the detection signals detected by a mode selection switch 40, a vehicle speed sensor 42, an accelerator position sensor 44, a brake sensor 46, an engine RPM sensor 48, an automatic transmission (AT) input rotation sensor 50, an automatic transmission (AT) output rotation sensor 52, a voltage sensor 54, and a current sensor 56. In addition, the control device 24 controls the inverter 16*a* for the main drive motor, the inverters 20*a* for the auxiliary drive motors 20, the high voltage DC/DC converter 26*a*, the low voltage DC/DC converter 26*b*, a fuel injection valve 58, a spark plug 60, and a hydraulic solenoid valve 62 of the transmission 14*c* by control signals to these components.

Next, the power supply structure of the hybrid drive device 10 according to the first embodiment of the present invention will be described. As illustrated in FIG. 6, the battery 18 and capacitor 22 included in the hybrid drive device 10 are connected in series to each other. The main drive motor 16 is driven by approximately 48 V, which is the reference output voltage of the battery 18, and the auxiliary drive motors 20 are driven by a maximum voltage of 120 V, which is higher than the sum (48 V) of the output voltage of the battery 18 and the inter-terminal voltage of the capacitor 22. Therefore, the auxiliary drive motors 20 are always driven by the electric power supplied via the capacitor 22.

In addition, the inverter 16*a* is mounted to the main drive motor 16 and converts the output of the battery 18 into alternating current through which the main drive motor 16, which is a permanent magnet motor, is driven. Similarly, the inverters 20*a* are mounted to the auxiliary drive motors 20 and convert the outputs of the battery 18 and the capacitor 22 into alternating current through which the auxiliary drive motors 20, which are induction motors, are driven. Since the auxiliary drive motors 20 are driven by a voltage higher than in the main drive motor 16, the harness (electric wires) 22*b* that supplies electric power to the auxiliary drive motors 20 needs to have high insulation. However, since the capacitor 22 is disposed close to the auxiliary drive motors 20, an increase in the weight due to high insulation of the harnesses 22*b* can be minimized.

Furthermore, when, for example, the vehicle 1 decelerates, the main drive motor 16 and the auxiliary drive motors 20 function as generators and generate electric power by regenerating the kinetic energy of the vehicle 1. The electric power regenerated by the main drive motor 16 is stored in the battery 18 and the electric power regenerated by the auxiliary drive motors 20 is stored mainly in the capacitor 22.

In addition, the high voltage DC/DC converter 26*a*, which is a voltage converting unit, is connected between the battery 18 and the capacitor 22 and this high voltage DC/DC converter 26*a* charges the capacitor 22 by raising the voltage of the battery 18 when the electric charge stored in the capacitor 22 is insufficient (when the inter-terminal voltage of the capacitor 22 drops). In contrast, when the inter-terminal voltage of the capacitor 22 rises to a predetermined voltage or higher due to regeneration of energy by the auxiliary drive motors 20, the battery 18 is charged by reducing the electric charge stored in the capacitor 22 and applying the electric charge to the battery 18. That is, the electric power regenerated by the auxiliary drive motors 20 is stored in the capacitor 22, and then the battery 18 is charged with a part of the stored electric charge via the high voltage DC/DC converter 26*a*.

Furthermore, the low voltage DC/DC converter 26*b* is connected between the battery 18 and 12V electric components 25 of the vehicle 1. Since many of the control device 24 of the hybrid drive device 10 and the electric components 25 of the vehicle 1 operate at a voltage of 12V, the voltage of the electric charge stored in the battery 18 is reduced to 12V by the low voltage DC/DC converter 26*b* and supplied to these devices.

Next, charging and discharging of the capacitor 22 will be described with reference to FIG. 7.

As illustrated in FIG. 7, the voltage of the capacitor 22 is the sum of the base voltage of the battery 18 and the inter-terminal voltage of the capacitor 22 itself. When, for example, the vehicle 1 decelerates, the auxiliary drive motors 20 regenerate electric power and the capacitor 22 is charged with the regenerated electric power. When the capacitor 22 is charged, the inter-terminal voltage rises relatively rapidly. When the inter-terminal voltage of the capacitor 22 rises to a predetermined voltage or more due to the charging, the voltage of the capacitor 22 is reduced by the high voltage DC/DC converter 26*a* and the battery 18 is charged. As illustrated in FIG. 7, the charging to the battery 18 from the capacitor 22 is performed relatively slowly than the charging to the capacitor 22 and the voltage of the capacitor 22 drops to a proper voltage relatively slowly.

That is, the electric power regenerated by the auxiliary drive motors 20 is temporarily stored in the capacitor 22 and then the battery 18 is slowly charged with the regenerated electric power. Depending on the time when the regeneration is performed, the regeneration of electric power by the auxiliary drive motors 20 may overlap with the charging from the capacitor 22 to the battery 18.

In contrast, the battery 18 is directly charged with the electric power regenerated by the main drive motor 16.

Next, the relationship between the vehicle speed and the output power of the motors in the hybrid drive device 10 according to the first embodiment of the present invention will be described with reference to FIG. 8. FIG. 8 is a graph illustrating the relationship between the speed of the vehicle 1 and the output power of the motors in the hybrid drive device 10 according to the embodiment. In FIG. 8, the output power of the main drive motor 16 is represented by a dotted line, the output power of one of the auxiliary drive motors 20 is represented by a dot-dash line, the sum of the output power of the two auxiliary drive motors 20 is represented by a dot-dot-dash line, and the sum of the output power of all motors is represented by a solid line. Although FIG. 8 illustrates the speed of the vehicle 1 on the horizontal axis and the output power of the motors on the vertical axis, since there is a certain relationship between the speed of the vehicle 1 and the number of revolutions of each of the motors, the output power of the motors draws curves similar to those in FIG. 8 even when the number of revolutions of each of the motors is represented on the horizontal axis.

Since a permanent magnet motor is adopted as the main drive motor 16 in the embodiment, as represented by the dotted line in FIG. 8, the output power of the main drive motor 16 is large in a low vehicle speed range in which the number of revolutions of the motor is low and the motor output power that can be output reduces as the vehicle speed increases. That is, in the embodiment, the main drive motor 16 is driven by approximately 48 V, outputs a torque (maximum torque) of approximately 200 Nm up to approximately 1000 rpm, and the torque reduces with the increase in the number of revolutions at approximately 1000 rpm or more. In addition, in the embodiment, the main drive motor 16 is configured to obtain a continuous output power of approximately 20 kW and a maximum output power of approximately 25 kW in the lowest low speed range.

In contrast, since induction motors are used as the auxiliary drive motors 20, the output power of the auxiliary drive motors 20 is very small in the low vehicle speed range, the output power increases as the speed becomes higher, the maximum output power is obtained at a vehicle speed close to 130 km/h or so, and then the motor output power reduces, as represented by the dot-dash line and the dot-dot-dash line in FIG. 8. In the embodiment, the auxiliary drive motors 20 are driven by approximately 120 V, and each of them obtains an output power of approximately 17 kW and the two motors obtain a total output power of approximately 34 kW at a vehicle speed close to 130 km/h or so. That is, in the embodiment, each of the auxiliary drive motors 20 has a peak of the torque curve and obtains a maximum torque of approximately 200 Nm at approximately 600 to 800 rpm.

As described above, the auxiliary drive motors 20, which are the in-wheel motors, generate the maximum output power in the high revolutions range equal to or more than the predetermined number of revolutions that is more than zero and the main drive motor 16, which is the body side motor, generates the maximum output power in the low revolutions range less than the predetermined number of revolutions. For example, the auxiliary drive motors 20 preferably generate the maximum output power in the high revolutions range equal to or more than approximately 450 rpm.

The solid line in FIG. 8 represents the sum of the output power of the main drive motor 16 and the two auxiliary drive motors 20. As is clear from this graph, in the embodiment, a maximum output power of approximately 53 kW is obtained at a vehicle speed close to 130 km/h or so and the travel condition requested in the WLTP test at this vehicle speed is satisfied at this maximum output power. In addition, although the output power values of the two auxiliary drive motors 20 are summed up even in the low vehicle speed range as represented by the solid line in FIG. 8, the auxiliary drive motors 20 are actually not driven in the low vehicle speed range as described later. That is, the vehicle is driven only by the main drive motor 16 at startup and in a low vehicle speed range and the two auxiliary drive motors 20 generate output power only when large output power is required in the high vehicle speed range (for example, when the vehicle 1 is accelerated in the high vehicle speed range). By using the induction motors (auxiliary drive motors 20) capable of generating large output power in the high revolutions range only in the high speed range as described above, sufficient output power can be obtained when necessary (for example, when acceleration at a predetermined speed or more is performed) while an increase in vehicle weight is kept low.

Figure 9:
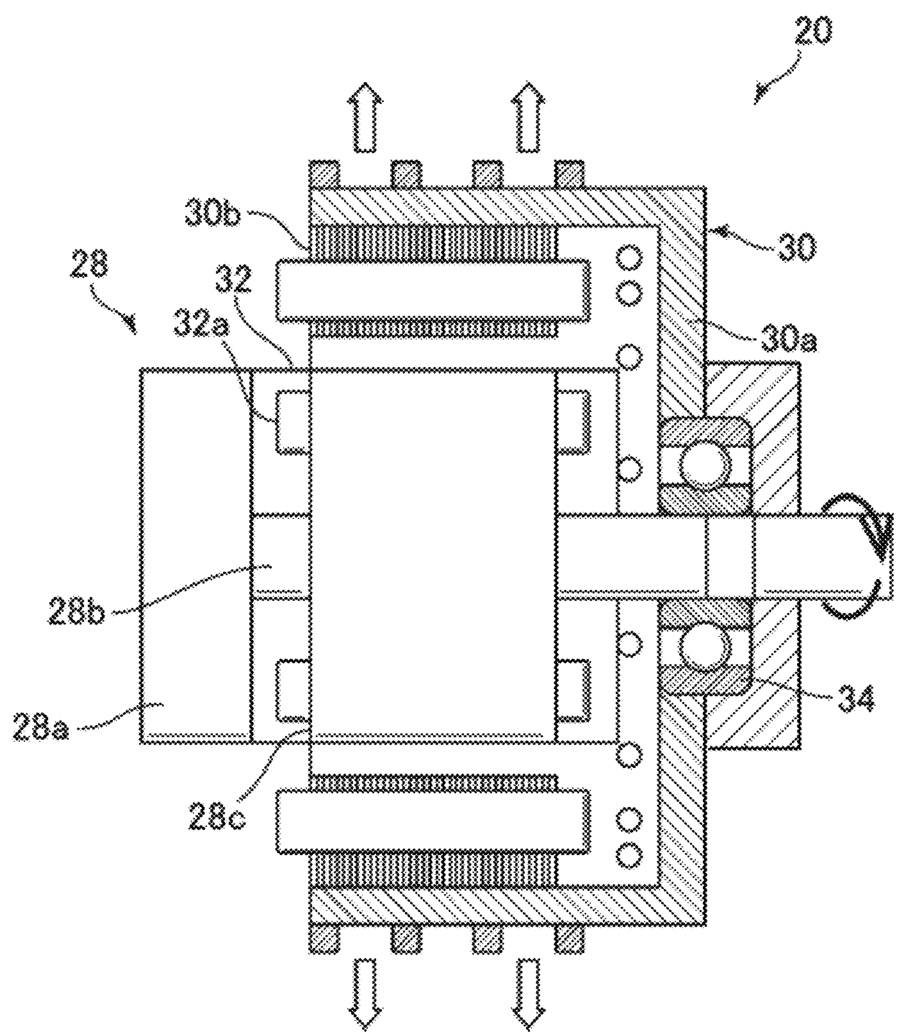
FIG. 9 is a sectional view schematically illustrating the structure of an auxiliary drive motor adopted in the hybrid drive device according to the first embodiment of the present invention.

Next, the structure of the auxiliary drive motors 20 adopted in the hybrid drive device 10 according to the first embodiment of the present invention will be described with reference to FIG. 9. FIG. 9 is a sectional view schematically illustrating the structure of the auxiliary drive motor 20.

As illustrated in FIG. 9, the auxiliary drive motor 20 is an outer rotor type induction motor including a stator 28 and a rotor 30 that rotates around this stator.

The stator 28 includes a substantially discoid stator base 28*a*, a stator shaft 28*b* extending from the center of the stator base 28*a*, and a stator coil 28*c* attached around the stator shaft 28*b*. In addition, the stator coil 28*c* is housed in an electrical insulating liquid chamber 32, immersed in electrical insulating liquid 32*a* that fills the electrical insulating liquid chamber, and subject to boiling cooling via the liquid.

The rotor 30 is formed in a substantially cylindrical shape so as to surround the periphery of the stator 28 and has a substantially cylindrical rotor body 30*a* with one end closed and a rotor coil 30*b* disposed on the inner peripheral wall surface of the rotor body 30*a*. The rotor coil 30*b* is disposed facing the stator coil 28*c* so as to generate induction current by the rotational magnetic field generated by the stator coil 28*c*. In addition, the rotor 30 is supported by a bearing 34 attached to the end of the stator shaft 28*b* so as to rotate smoothly around the stator 28.

The stator base 28*a* is supported by an upper arm 8*a* and a lower arm 8*b* (FIG. 4) that suspend the front wheels of the vehicle 1. In contrast, the rotor body 30*a* is directly fixed to the wheels of the front wheels 2*b* (not illustrated). Alternating current converted by the inverters 20*a* flows through the stator coil 28*c* and generates a rotational magnetic field. This rotational magnetic field causes an induced current to flow through the rotor coil 30*b* and generates a driving force that rotates the rotor body 30*a*. As described above, the driving forces generated by the auxiliary drive motors 20 rotationally drives the wheels of the front wheels 2*b* (not illustrated) directly.

Next, the operation of the motor travel mode and the operation of the internal combustion engine travel mode performed by the control device 24 will be described with reference to FIG. 10 and FIG. 11. FIG. 10 is a flowchart illustrating control by the control device 24 and FIG. 11 is a graph illustrating examples of the operations of these modes. The flowchart illustrated in FIG. 10 is repeatedly executed at predetermined time intervals while the vehicle 1 operates.

The graph illustrated in FIG. 11 represents, in order from the top, the speed of the vehicle 1, the torque generated by the engine 12, the torque generated by the main drive motor 16, the torque generated by the auxiliary drive motors 20, the voltage of the capacitor 22, the current of the capacitor 22, and the current of the battery 18. In the graph representing the torque of the main drive motor 16 and the torques of the auxiliary drive motors 20, positive values mean the state in which motors generate torques and negative values mean the state in which motors regenerate the kinetic energy of the vehicle 1. In addition, in the graph representing the current of the capacitor 22 and the current of the battery 18, negative values mean the state in which electric power is supplied (discharged) to motors and positive values mean the state of charging with the electric power regenerated by motors.

First, in step S1 in FIG. 10, it is determined whether the vehicle 1 has been set to the internal combustion engine travel mode (ENG mode). That is, the vehicle 1 has the mode selection switch 40 (FIG. 5) that selects either the internal combustion engine travel mode or the motor travel mode (EV mode) and it is determined in step S1 which mode has been set. Since the motor travel mode is set at time $t_1$ in FIG. 11, the processing of the flowchart in FIG. 10 proceeds to step S2.

Next, in step S2, it is determined whether the speed of the vehicle 1 is equal to or more than a predetermined vehicle speed. The processing proceeds to step S6 when the speed is equal to or more than the predetermined vehicle speed or the processing proceeds to step S3 when the speed is less than the predetermined vehicle speed. Since the driver has started the vehicle 1 and the vehicle speed is low at time $t_1$ in FIG. 11, the processing of the flowchart proceeds to step S3.

Furthermore, in step S3, it is determined whether the vehicle 1 is decelerating (whether the brake pedal (not illustrated) of the vehicle 1 is being operated). The processing proceeds to step S5 when the vehicle 1 is decelerating or the processing proceeds to step S4 when the vehicle 1 is accelerating or traveling at a constant speed (when the brake sensor 46 (FIG. 5) does not detect the operation of the brake pedal). Since the driver has started the vehicle 1 and is accelerating the vehicle 1 (accelerator position sensor 44 (FIG. 5) has detected that the accelerator pedal of the vehicle 1 has been operated by a predetermined amount or more) at time $t_1$ in FIG. 11, the processing of the flowchart proceeds to step S4 and the processing of the flowchart in FIG. 10 is completed once. In step S4, the main drive motor 16 generates a torque and the vehicle speed increases (from time $t_1$ to time $t_2$ in FIG. 11). At this time, since discharge current flows from the battery 18 that supplies electric power to the main drive motor 16 and discharge current from the capacitor 22 remains zero because the auxiliary drive motors 20 do not generate torques, the voltage of the capacitor 22 does not change. The current and voltage are detected by the voltage sensor 54 and the current sensor 56 (FIG. 5) and input to the control device 24. In addition, from time $t_1$ to time $t_2$ in FIG. 11, the engine 12 is not driven because the motor travel mode is set. That is, since the control device 24 stops fuel injection via the fuel injection valve 58 of the engine 12 and does not perform ignition via the ignition plug 60, the engine 12 does not generate a torque.

In the example illustrated in FIG. 11, the vehicle 1 accelerates from time $t_1$ to time $t_2$ and then travels at a constant speed until time $t_3$. In this period, the processing of steps S1, S2, S3, and S4 in the flowchart in FIG. 10 is repeatedly executed. During this low speed travel, since the torque generated by the main drive motor 16 becomes smaller than the torque during the acceleration, the current discharged from the battery 18 also becomes smaller.

Next, when the driver operates the brake pedal (not illustrated) of the vehicle 1 at time $t_3$ in FIG. 11, the processing of the flowchart in FIG. 10 proceeds to step S5 from step S3. In step S5, the driving by the main drive motor 16 is stopped (no torque is generated) and the kinetic energy of the vehicle 1 is regenerated as electric power by the auxiliary drive motors 20. The vehicle 1 is decelerated by the regeneration of the kinetic energy, the discharge current from battery 18 becomes zero, the charge current flows through the capacitor 22 because the electric power is regenerated by the auxiliary drive motors 20, and the voltage of the capacitor 22 rises.

When the vehicle 1 stops at time $t_4$ in FIG. 11, the charge current to the capacitor 22 becomes zero and the voltage of the capacitor 22 also becomes constant. Next, the vehicle 1 is started again at time $t_5$ and reaches a constant speed travel (time $t_6$), and the processing of steps S1, S2, S3, and S4 in the flowchart in FIG. 10 is repeatedly executed until the deceleration of the vehicle 1 is started (time $t_7$). When the deceleration of the vehicle is started at time $t_7$, the processing of steps S1, S2, S3, and S5 in the flowchart in FIG. 10 is repeatedly executed and the auxiliary drive motors 20 regenerates electric power. As described above, the motor travel mode is set while the vehicle starts and stops repeatedly at a relatively low speed in urban areas or the like, the vehicle 1 functions purely as an electric vehicle (EV) and the engine 12 does not generate a torque.

Furthermore, when the vehicle 1 is started at time $t_8$ in FIG. 11, the processing of steps S1, S2, S3, and S4 in the flowchart in FIG. 10 is repeatedly executed and the vehicle 1 is accelerated. Next, when the speed of the vehicle 1 detected by the vehicle speed sensor 42 (FIG. 5) exceeds a predetermined first vehicle speed at time $t_9$, the processing of the flowchart proceeds to step S6 from step S2. In step S6, it is determined whether the vehicle 1 is decelerating (the brake pedal is being operated). Since the vehicle 1 is not decelerating at time $t_9$, the processing of the flowchart proceeds to step S7. In step S7, it is determined whether the vehicle 1 is accelerating by a predetermined value or more (whether the accelerator pedal of the vehicle 1 has been operated by a predetermined amount or more). In the embodiment, the predetermined first vehicle speed is set to approximately 100 km/h, which is more than a travel speed of 0 km/h.

Since the vehicle 1 is accelerating by a predetermined value or more at time $t_9$ in the example illustrated in FIG. 11, the processing proceeds to step S8, in which the main drive motor 16 is driven and the auxiliary drive motors 20 are also driven. When the vehicle 1 is accelerated by a predetermined value or more at the predetermined first vehicle speed or more in the motor travel mode as described above, electric power is supplied to the main drive motor 16 and the auxiliary drive motors 20 to obtain the required power, and this drives the vehicle 1. In other words, the control device 24 starts the vehicle 1 (time $t_8$) by causing the main drive motor 16 to generate a driving force and then causes the auxiliary drive motors 20 to generate driving forces when the travel speed of the vehicle 1 detected by the vehicle speed sensor 42 reaches the first vehicle speed (time $t_9$). At this time, the battery 18 supplies electric power to the main drive motor 16 and the capacitor 22 supplies electric power to the auxiliary drive motors 20. Since the capacitor 22 supplies electric power as described above, the voltage of the capacitor 22 drops. While the vehicle 1 is driven by the main drive motor 16 and the auxiliary drive motors 20 (from time $t_9$ to time $t_{10}$), the processing of steps S1, S2, S6, S7, and S8 in the flowchart is repeatedly executed.

As described above, the auxiliary drive motors 20 generate driving forces when the travel speed of the vehicle 1 is equal to or more than the predetermined first vehicle speed and are prohibited from generating driving forces when the travel speed is less than the first vehicle speed. Although the first vehicle speed is set to approximately 100 km/h in the embodiment, the first vehicle speed may be set to any vehicle speed that is equal to or more than approximately 50 km/h according to the output characteristics of the adopted auxiliary drive motors 20. In contrast, the main drive motor 16 generates a driving force when the travel speed of the vehicle 1 is less than a predetermined second vehicle speed including zero or when the travel speed is equal to or more than the second vehicle speed. The predetermined second vehicle speed may be set to a vehicle speed identical to or different from the first vehicle speed. In addition, in the embodiment, the main drive motor 16 always generates a driving force when the driving force is requested in the motor travel mode.

Next, when the vehicle 1 shifts to a constant speed travel (when the accelerator pedal is operated by less than a predetermined amount) at time $t_{10}$ in FIG. 11, the processing of steps S1, S2, S6, S7, and S9 in the flowchart is repeatedly executed. In step S9, driving by the auxiliary drive motors 20 is stopped (no torque is generated) and the vehicle 1 is driven only by the main drive motor 16. Even when the vehicle 1 travels at the predetermined vehicle speed or more, the vehicle 1 is driven only by the main drive motor 16 if the acceleration is less than the predetermined amount.

In addition, since the voltage of the capacitor 22 drops to the predetermined value or less because the capacitor 22 has driven the auxiliary drive motors 20 from time $t_9$ to time $t_{10}$, the control device 24 sends a signal to the high voltage DC/DC converter 26*a* at time $t_{10}$ to charge the capacitor 22. That is, the high voltage DC/DC converter 26*a* raises the voltage of the electric charge stored in the battery 18 and charges the capacitor 22. This causes the current for driving the main drive motor 16 and the current for charging the capacitor 22 to be discharged from the battery 18 from time $t_{10}$ to time $t_{11}$ in FIG. 11. If large electric power is regenerated by the auxiliary drive motors 20 and the voltage of the capacitor 22 rises to a predetermined value or more, the control device 24 sends a signal to the high voltage DC/DC converter 26*a* to reduce the voltage of the capacitor 22 and charges the battery 18. As described above, the electric power regenerated by the auxiliary drive motors 20 is consumed by the auxiliary drive motors 20, or stored in the capacitor 22 and then used to charge the battery 18 via the high voltage DC/DC converter 26*a*.

When the vehicle 1 decelerates (the brake pedal is operated) at time $t_{11}$ in FIG. 11, the processing of steps S1, S2, S6, and S10 in the flowchart will be repeatedly executed. In step S10, the kinetic energy of the vehicle 1 is regenerated as electric power by both the main drive motor 16 and the auxiliary drive motors 20. The electric power regenerated by the main drive motor 16 is stored in the battery 18 and the electric power regenerated by the auxiliary drive motors 20 is stored in the capacitor 22. As described above, when the brake pedal is operated at the specified vehicle speed or more, electric power is regenerated by both the main drive motor 16 and the auxiliary drive motors 20 and electric charge is stored in the capacitor 22 and the battery 18.

Next, at time $t_{12}$ in FIG. 11, the driver switches the mode of the vehicle 1 from the motor travel mode to the internal combustion engine travel mode by operating the mode selection switch 40 (FIG. 5) and depresses the accelerator pedal (not illustrated). When the mode of the vehicle 1 is switched to the internal combustion engine travel mode, the processing of the flowchart in FIG. 10 by the control device 24 proceeds to step S11 from step S1, and the processing of step S11 and subsequent steps is executed.

First, in step S11, it is determined whether the vehicle 1 stops. When the vehicle 1 does not stop (the vehicle 1 is traveling), it is determined in step S12 whether the vehicle 1 is decelerating (whether the brake pedal (not illustrated) is being operated). Since the vehicle 1 is traveling and the driver is operating the accelerator pedal at time $t_{12}$ in FIG. 11, the processing of the flowchart in FIG. 10 proceeds to step S13.

In step S13, the supply of fuel to the engine 12 starts and the engine 12 generates a torque. That is, since the output shaft (not illustrated) of the engine 12 is directly connected to the output shaft (not illustrated) of the main drive motor 16 in the embodiment, the output shaft of the engine 12 always rotates together with driving by the main drive motor 16. However, the engine 12 does not generate a torque in the motor travel mode because fuel supply to the engine 12 is performed, but, in the internal combustion engine travel mode, the engine 12 generates a torque because fuel supply (fuel injection by the fuel injection valve 58 and ignition by the ignition plug 60) starts.

In addition, immediately after switching from the motor travel mode to the internal combustion engine travel mode, the control device 24 causes the main drive motor 16 to generate a torque for starting the engine (from time $t_{12}$ to time $t_{13}$ in FIG. 11). This torque for starting the engine is generated to cause the vehicle 1 to travel until the engine 12 actually generates a torque after fuel supply to the engine 12 is started and suppress torque fluctuations before and after the engine 12 generates a torque. In addition, in the embodiment, when the number of revolutions of the engine 12 at the time of switching to the internal combustion engine travel mode is less than a predetermined number of revolutions, fuel supply to the engine 12 is not started and the fuel supply is started when the number of revolutions of the engine 12 is equal to or more than the predetermined number of revolutions due to the torque for starting the engine. In the embodiment, when the number of revolutions of the engine 12 detected by the engine RPM sensor 48 rises to 2000 rpm or more, fuel supply is started.

While the vehicle 1 accelerates or travels at a constant speed after the engine 12 is started, the processing of steps S1, S11, S12, and S13 in the flowchart in FIG. 10 is repeatedly executed (from time $t_{13}$ to time $t_{14}$ in FIG. 11). As described above, in the internal combustion engine travel mode, the engine 12 exclusively outputs the power for driving the vehicle 1 and the main drive motor 16 and the auxiliary drive motors 20 do not output the power for driving the vehicle 1. Accordingly, the driver can enjoy the driving feeling of the vehicle 1 driven by the internal combustion engine.

Next, when the driver operates the brake pedal (not illustrated) at time $t_{14}$ in FIG. 11, the processing of the flowchart in FIG. 10 proceeds to step S14 from step S12. In step S14, fuel supply to the engine 12 is stopped and fuel consumption is suppressed. Furthermore, in step S15, the main drive motor 16 and the auxiliary drive motors 20 regenerate the kinetic energy of the vehicle 1 as electric energy and charge current flows through the battery 18 and the capacitor 22. As described above, during deceleration of the vehicle 1, the processing of steps S1, S11, S12, S14, and S15 is repeatedly executed (from time $t_{14}$ to time $t_{15}$ in FIG. 11).

During deceleration of the vehicle 1 in the internal combustion engine travel mode, the control device 24 performs downshift torque adjustment by driving the auxiliary drive motors 20 in switching (shifting) of the transmission 14*c*, which is a stepped transmission. The torque generated by this torque adjustment complements an instantaneous torque drop or the like and is not equivalent to the torque that drives the vehicle 1. Details on torque adjustment will be described later.

On the other hand, when the vehicle 1 stops at time $t_{15}$ in FIG. 11, the processing of the flowchart in FIG. 10 proceeds to step S16 from step S11. In step S16, the control device 24 supplies the minimum fuel required to maintain the idling of the engine 12. In addition, the control device 24 generates an assist torque via the main drive motor 16 so that the engine 12 can maintain idling at a low number of revolutions. As described above, while the vehicle 1 stops, the processing of steps S1, S11, and S16 is repeatedly executed (from time $t_{15}$ to time $t_{16}$ in FIG. 11).

Although the engine 12 is a flywheel-less engine in the embodiment, since the assist torque generated by the main drive motor 16 acts as a pseudo flywheel, the engine 12 can maintain smooth idling at a low number of revolutions. In addition, adoption of a flywheel-less engine makes the response of the engine 12 high during a travel in the internal combustion engine travel mode, thereby enabling driving with a good feeling.

In addition, when the vehicle 1 starts from a stop state in the internal combustion engine travel mode, the control device 24 increases the number of revolutions of the main drive motor 16 (the number of revolutions of the engine 12) to a predetermined number of revolutions by sending a signal to the main drive motor 16. After the number of revolutions of the engine is increased to the predetermined number of revolutions, the control device 24 supplies the engine 12 with fuel for driving the engine, causes the engine 12 to perform driving, and performs a travel in the internal combustion engine travel mode.

Next, torque adjustment during switching (shifting) of the transmission 14*c* will be described with reference to FIG. 12.

FIG. 12 is a diagram that schematically illustrates changes in the acceleration that acts on the vehicle when transmission 14*c* downshifts or upshifts, and represents, in order from the top, examples of downshift torque down, downshift torque assistance, and upshift torque assistance.

In the internal combustion engine travel mode, the hybrid drive device 10 according to the first embodiment of the present invention causes the control device 24 to automatically switch the clutch 14*b* and the transmission 14*c*, which is an automatic transmission, according to the vehicle speed and the number of revolutions of the engine when the automatic shift mode is set. As illustrated in the upper part of FIG. 12, when the transmission 14*c* downshifts (shifts to a low speed) with negative acceleration acting on the vehicle 1 during deceleration (time $t_{101}$ in FIG. 12), the control device 24 disconnects the clutch 14*b* to disconnect the output shaft of the engine 12 from the main drive wheels (rear wheels 2*a*). When the engine 12 is disconnected from the main drive wheels in this way, since the rotation resistance of the engine 12 no longer acts on the main drive wheels, the acceleration acting on the vehicle 1 instantaneously changes to a positive side, as indicated by the dotted line in the upper part of FIG. 12. Next, the control device 24 sends a control signal to the transmission 14*c* and switches the built-in hydraulic solenoid valve 62 (FIG. 5) to increase the reduction ratio of the transmission 14*c*. Furthermore, when the control device 24 connects the clutch 14*b* at time $t_{102}$ at which the downshift is completed, the acceleration changes to a negative side again. Although the period from the start to the completion of a downshift (from time $t_{101}$ to time $t_{102}$) is generally 300 to 1000 msec, the occupant is given an idle running feeling and may have a discomfort feeling due to a so-called torque shock in which the torque acting on the vehicle instantaneously changes.

In the hybrid drive device 10 according to the embodiment, the control device 24 makes torque adjustment by sending a control signal to the auxiliary drive motors 20 at the time of a downshift to suppress the idle running feeling of the vehicle 1. Specifically, when the control device 24 performs a downshift by sending a signal to the clutch 14*b* and the transmission 14*c*, the control device 24 reads the number of revolutions of the input shaft and the number of revolutions of the output shaft of the transmission 14*c* detected by the automatic transmission input rotation sensor 50 and the automatic transmission output rotation sensor 52 (FIG. 5), respectively. Furthermore, the control device 24 predicts changes in the acceleration generated in the vehicle 1 based on the number of revolutions of the input shaft and the number of revolutions of the output shaft that have been read and causes the auxiliary drive motors 20 to regenerate energy. This suppresses an instantaneous rise in the acceleration (change to the positive side) of the vehicle 1 due to a torque shock as indicated by the solid line in the upper part of FIG. 12, thereby suppressing an idling running feeling. Furthermore, in the embodiment, the torque shock in the main drive wheels (rear wheels 2*a*) caused by a downshift is complemented by the auxiliary drive wheels (front wheels 2*b*) via the auxiliary drive motors 20. Accordingly, torque adjustment can be made without being affected by the dynamic characteristics of the power transmission mechanism 14 that transmits power from the engine 12 to the main drive wheels.

In addition, as indicated by the dotted line in the middle part of FIG. 12, when a downshift is started at time $t_{103}$ with positive acceleration acting on the vehicle 1 during acceleration, the output shaft of the engine 12 is disconnected from the main drive wheels (rear wheels 2*a*). Accordingly, since the drive torque by the engine 12 does not act on the rear wheels 2*a* and a torque shock occurs, the occupant may be given a stall feeling by the time the downshift is completed at time $t_{104}$. That is, the acceleration of the vehicle 1 instantaneously changes to the negative side at time $t_{103}$ at which a downshift is started and the acceleration changes to the positive side at time $t_{104}$ at which the downshift is completed.

In the hybrid drive device 10 according to the embodiment, when performing a downshift, the control device 24 predicts changes in the acceleration caused in the vehicle 1 based on detection signals from the automatic transmission input rotation sensor 50 and the automatic transmission output rotation sensor 52 and causes the auxiliary drive motors 20 to generate driving forces. As indicated by the solid line in the middle part of FIG. 12, this suppresses an instantaneous drop (change to the negative side) of the acceleration of the vehicle 1 by a torque shock and suppresses a stall feeling.

Furthermore, as indicated by the dotted line in the lower part of FIG. 12, when an upshift is started at time $t_{105}$ with positive acceleration acting on the vehicle 1 (positive acceleration reduces with time) during acceleration, the output shaft of the engine 12 is disconnected from the main drive wheels (rear wheels 2*a*). Accordingly, since the drive torque by the engine 12 does not act on the rear wheels 2*a* and a torque shock occurs, the occupant may be given a stall feeling by the time the upshift is completed at time $t_{106}$. That is, the acceleration of the vehicle 1 instantaneously changes to the negative side at time $t_{105}$ at which the upshift is started and the acceleration changes to the positive side at time $t_{106}$ at which the upshift is completed.

In the embodiment, when performing an upshift, the control device 24 predicts changes in the acceleration caused in the vehicle 1 based on detection signals from the automatic transmission input rotation sensor 50 and the automatic transmission output rotation sensor 52 and causes the auxiliary drive motors 20 to generate driving forces. As indicated by the solid line in the lower part of FIG. 12, this suppresses an instantaneous drop (change to the negative side) of the acceleration of the vehicle 1 due to a torque shock and suppresses a stall feeling.

As described above, the adjustment of the drive torque by the auxiliary drive motors 20 during a downshift or an upshift of the transmission 14*c* is performed in a very short time and does not substantially drive the vehicle 1. Therefore, the power generated by the auxiliary drive motors 20 can be generated by the electric charge regenerated by the auxiliary drive motors 20 and stored in the capacitor 22. In addition, the adjustment of the drive torque by the auxiliary drive motors 20 can be applied to an automatic transmission with a torque converter, an automatic transmission without a torque converter, an automated manual transmission, and the like.

In the hybrid drive device 10 according to the first embodiment of the present invention, the auxiliary drive motors 20, which are the in-wheel motors, generate the maximum output power in the high revolutions range equal to or more than the predetermined number of revolutions (FIG. 8). Accordingly, by using the driving force of the main drive motor 16 for a travel requested for output power in the low revolutions range (from time $t_1$ to time $t_9$ in FIG. 11), such as, for example, starting or a low speed travel and using the in-wheel motor for a travel requested for output power in the high revolutions range, such as a high speed travel (from time $t_9$ to time $t_{10}$ in FIG. 11), the vehicle 1 can be efficiently driven by using small in-wheel motors.

In addition, the hybrid drive device 10 according to the embodiment adopts induction motors as the in-wheel motors, which are the auxiliary drive motors 20. Accordingly, large output power is obtained in the high revolutions range (FIG. 8) and the weight thereof can be reduced. Therefore, by adopting induction motors as the in-wheel motors, the motors capable of generating sufficient output power in the required revolutions range can be made light weight.

Furthermore, the hybrid drive device 10 according to the embodiment uses the in-wheel motors, which are the auxiliary drive motors 20, so that large output power is requested in the high revolutions range. Accordingly, the in-wheel motors can generate sufficient output power in the rotation range in which high output power is requested, without providing a deceleration mechanism (FIG. 9). In addition, in the hybrid drive device 10 according to the embodiment, since the wheels are directly driven without intervention of a deceleration mechanism, the deceleration mechanism with very large weight can be omitted and an output loss due to the rotation resistance of the deceleration mechanism can be avoided.

In addition, in the hybrid drive device 10 according to the embodiment, the main drive motor 16, which is the body side motor, is provided in the body of the vehicle 1 and this main drive motor 16 generates the maximum output power in the low revolutions range less than the predetermined number of revolutions (FIG. 8). Accordingly, since the main drive motor 16 can efficiently drive the vehicle in the low revolutions range in which the auxiliary drive motors 20, which are the in-wheel motors, cannot generate high output power, the vehicle can be efficiently driven in any rotation range.

Furthermore, in the hybrid drive device 10 according to the embodiment, the permanent magnet motor is adopted as the main drive motor 16, which is the body side motor requested for a large torque in the low rotation range. Generally, a permanent magnet motor has a relatively large starting torque and can obtain a large output power in the low rotation range. Therefore, in the embodiment, the main drive motor 16 capable of generating a sufficient torque in a required rotation range can be made lightweight.

In addition, in the hybrid drive device 10 according to the embodiment, since the voltage of the battery 18 and the capacitor 22 connected in series is applied to the in-wheel motors, which are the auxiliary drive motors 20, the auxiliary drive motors 20 can be driven by a high voltage while using the battery 18 of a relatively low voltage. In addition, since the driving forces of the in-wheel motors, which are the auxiliary drive motors 20, are used only in the range (from time $t_9$ to time $t_{10}$ in FIG. 11) in which the travel speed of the vehicle is high, electric power is supplied to the auxiliary drive motors 20 in relatively short time and the auxiliary drive motors 20 can be driven by a high voltage using the capacitor 22 of a relatively small capacity.

The vehicle drive device according to the first embodiment of the present invention has been described above. Although the vehicle drive device according to the present invention is applied to an FR vehicle in the first embodiment described above, the present invention is applicable to various types of vehicles such as a so-called FF vehicle in which an engine and/or a main drive motor are disposed in the front portion of the vehicle and the front wheels are the main drive wheels or a so-called RR vehicle in which an engine and/or a main drive motor are disposed in the rear portion of the vehicle and the rear wheels are the main drive wheels.

Figure 13:
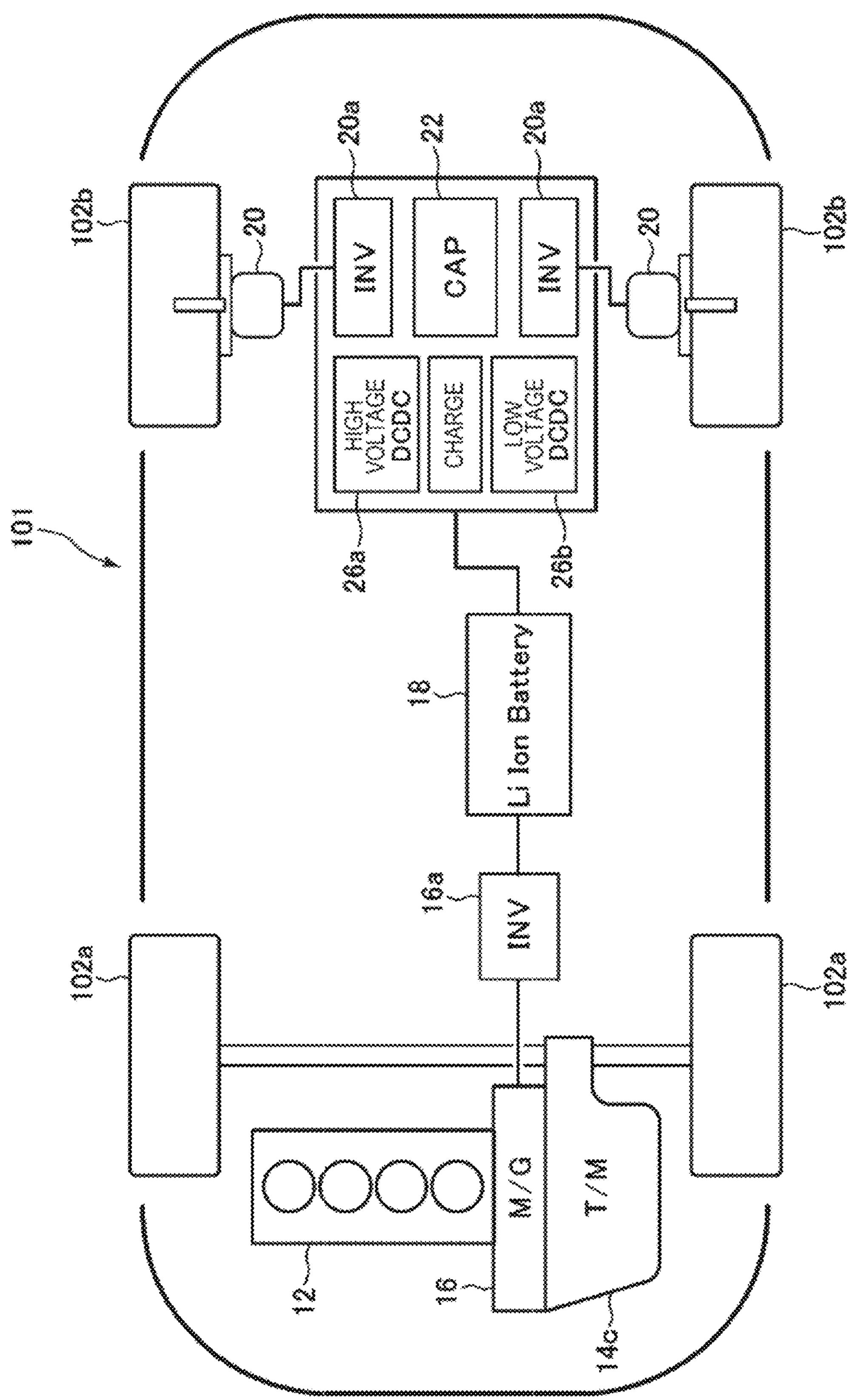
FIG. 13 is a layout diagram illustrating a vehicle in which a hybrid drive device according to a first modification of the present invention is installed.

When the present invention is applied to an FF vehicle, it is possible to adopt a layout in which, for example, the engine 12, the main drive motor 16, and the transmission 14*c* are disposed in the front portion of a vehicle 101 and front wheels 102*a* are driven as the main drive wheels, as illustrated in FIG. 13. In addition, the auxiliary drive motors 20 can be disposed as in-wheel motors in the left and right rear wheels 102*b*, which are the auxiliary drive wheels. As described above, the present invention can be configured so that the main drive motor 16, which is the body side motor, drives the front wheels 102*a*, which are the main drive wheels, and the auxiliary drive motors 20, which are the in-wheel motors, drive the rear wheels 102*b*, which are the auxiliary drive wheels. In this layout, the main drive motor 16 can be driven by the electric power supplied via the inverter 16*a* and stored in the battery 18. In addition, an integrated unit formed by integrating the capacitor 22, the high voltage DC/DC converter 26*a* and the low voltage DC/DC converter 26*b*, which are voltage converting units, and the two inverters 20*a* can be disposed in the rear portion of the vehicle 101. Furthermore, the auxiliary drive motors 20 can be driven by the electric power supplied via the inverters 20*a* and stored in the battery 18 and the capacitor 22 that are disposed in series.

Figure 14:
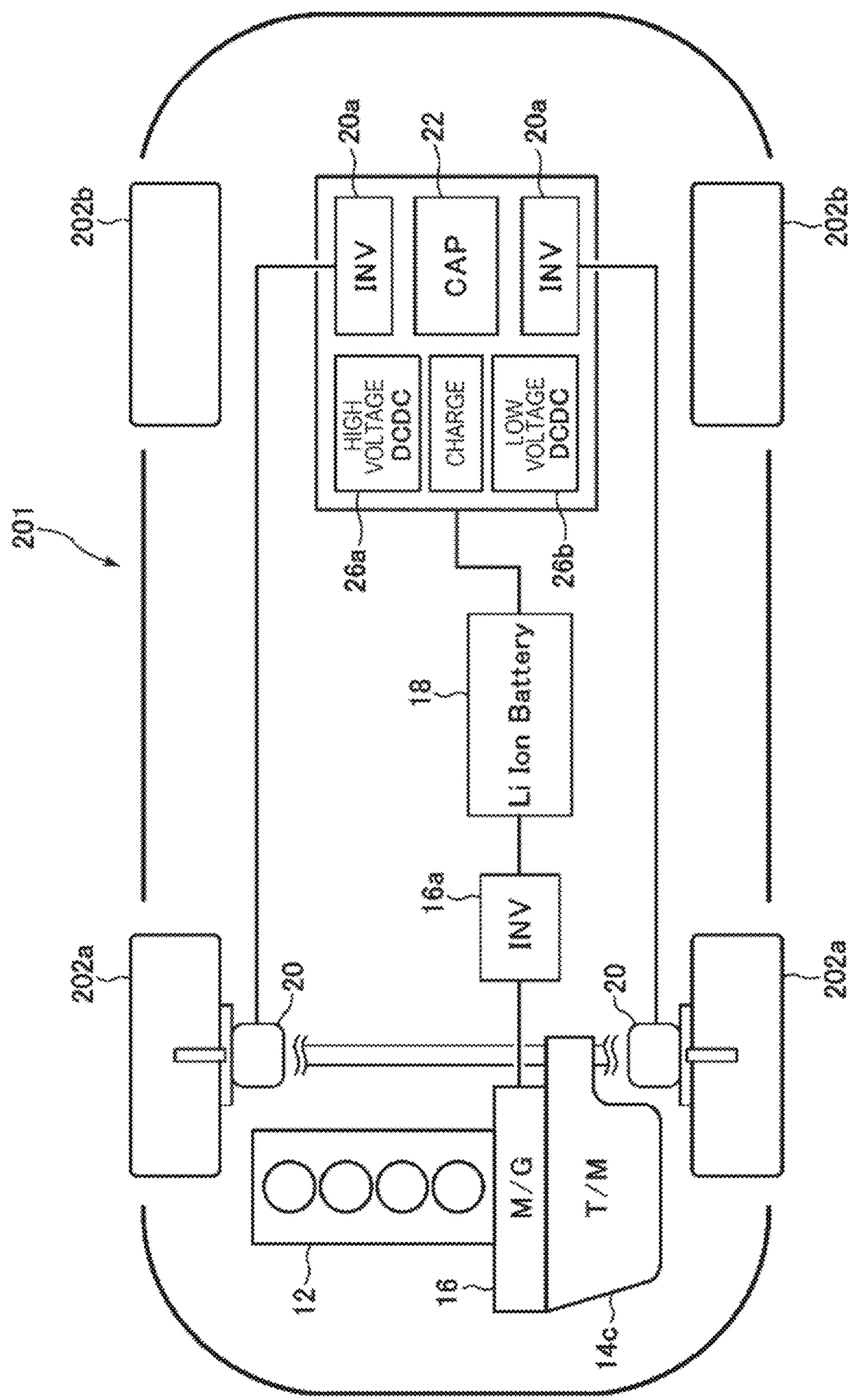
FIG. 14 is a layout diagram illustrating a vehicle in which a hybrid drive device according to a second modification of the present invention is installed.

When the present invention is applied to an FF vehicle, it is possible to adopt a layout in which, for example, the engine 12, the main drive motor 16, and the transmission 14*c* are disposed in the front portion of a vehicle 201, and the front wheels 202*a* are driven as the main drive wheels, as illustrated in FIG. 14. In addition, the auxiliary drive motors

20 can be disposed as in-wheel motors in the left and right front wheels 202*a*, which are the main drive wheels. As described above, the present invention can be configured so that the main drive motor 16, which is the body side motor, drives the front wheels 202*a*, which are the main drive wheels, and the auxiliary drive motors 20, which are the in-wheel motors, also drive the front wheels 202*a*, which are the main drive wheels. In this layout, the main drive motor 16 can be driven by the electric power supplied via the inverter 16*a* and stored in the battery 18. In addition, an integrated unit formed by integrating the capacitor 22, the high voltage DC/DC converter 26*a* and the low voltage DC/DC converter 26*b*, which are voltage converting units, and the two inverters 20*a* can be disposed in the rear portion of the vehicle 201. Furthermore, the auxiliary drive motors 20 can be driven by the electric power supplied via the inverters 20*a* and stored in the battery 18 and the capacitor 22 that are disposed in series.

Figure 15:
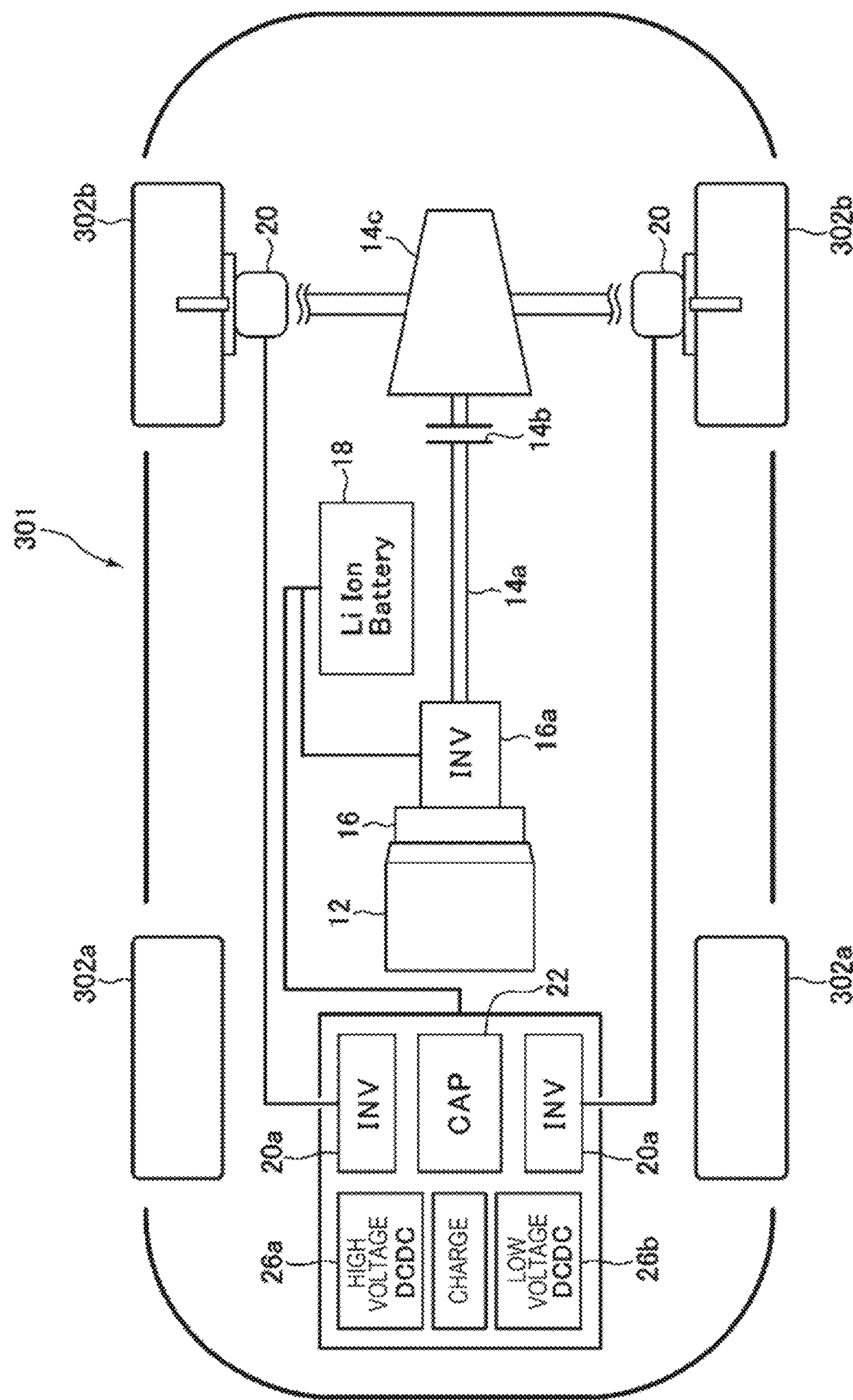
FIG. 15 is a layout diagram illustrating a vehicle in which a hybrid drive device according to a third modification of the present invention is installed.

In contrast, when the present invention is applied to an FR vehicle, it is possible to adopt a layout in which, for example, the engine 12 and the main drive motor 16 are disposed in the front portion of a vehicle 301 and rear wheels 302*b* are driven as the main drive wheels by leading electric power to the rear portion of the vehicle 301 via the propeller shaft 14*a*, as illustrated in FIG. 15. The rear wheels 302*b* are driven by the power led to the rear portion by the propeller shaft 14*a* via the clutch 14*b* and the transmission 14*c*, which is a stepped transmission. In addition, the auxiliary drive motors 20 can be disposed as in-wheel motors in the left and right rear wheels 302*b*, which are the main drive wheels. As described above, the present invention can be configured so that the main drive motor 16, which is the body side motor, drives the rear wheels 302*b*, which are the main drive wheels, and the auxiliary drive motors 20, which are the in-wheel motors, also drive the rear wheels 302*b*, which are the main drive wheels. In this layout, the main drive motor 16 can be driven by the electric power supplied via the inverter 16*a* and stored in the battery 18. In addition, an integrated unit formed by integrating the capacitor 22, the high voltage DC/DC converter 26*a* and the low voltage DC/DC converter 26*b*, which are voltage converting units, and the two inverters 20*a* can be disposed in the front portion of the vehicle 301. Furthermore, the auxiliary drive motors 20 can be driven by the electric power supplied via the inverters 20*a* and stored in the battery 18 and the capacitor 22 that are disposed in series.

Although preferred embodiments of the present invention have been described above, various modifications can be made to the embodiments described above. In particular, the present invention is applied to a hybrid drive device including an engine and a motor in the embodiments described above, but the present invention is applicable to a vehicle drive device that drives a vehicle only by a motor without having an engine.

REFERENCE SIGNS LIST

1: vehicle
2*a*: rear wheel (main drive wheel)
2*b*: front wheel (auxiliary drive wheel)
4*a*: subframe
4*b*: front side frame
4*c*: dash panel
4*d*: propeller shaft tunnel
6*a*: engine mount
6*b*: capacitor mount
8*a*: upper arm
8*b*: lower arm
8*c*: spring
8*d*: shock absorber
10: hybrid drive device (vehicle drive device)
12: engine (internal combustion engine)
14: power transmission mechanism
14*a*: propeller shaft
14*b*: clutch
14*c*: transmission (stepped transmission, automatic transmission)
14*d*: torque tube
16: main drive motor (main drive electric motor, body side motor)
16*a*: inverter
18: battery (electric storage unit)
20: auxiliary drive motor (auxiliary drive electric motor, in-wheel motor)
20*a* inverter
22: capacitor
22*a*: bracket
22*b*: harness
24: control device (controller)
25: electrical component
26*a*: high voltage DC/DC converter (voltage converting unit)
26*b*: low voltage DC/DC converter
28: stator
28*a*: stator base
28*b*: stator shaft
28*c*: stator coil
30: rotor
30*a*: rotor body
30*b*: rotor coil
32: electrical insulating liquid chamber
32*a*: electrical insulating liquid
34: bearing
40: mode selection switch
42: vehicle speed sensor
44: accelerator position sensor
46: brake sensor
48: engine RPM sensor
50: automatic transmission input rotation sensor
52: automatic transmission output rotation sensor
54: voltage sensor
56: current sensor
58: fuel injection valve
60: spark plug
62: hydraulic solenoid valve
101: vehicle
102*a*: front wheel (main drive wheel)
102*b*: rear wheel (auxiliary drive wheel)
201: vehicle
202*a*: front wheel (main drive wheel)
301: vehicle
302*b*: rear wheel (main drive wheel)

The invention claimed is:

1. A vehicle drive device that uses in-wheel motors to drive a vehicle, the vehicle drive device comprising:

a body side motor that is provided in a body of the vehicle and drives main drive wheels of the vehicle, the body side motor being not provided in either of the main drive wheels; and in-wheel motors that are provided in auxiliary drive wheels of the vehicle respectively and drive the auxiliary drive wheels respectively, wherein the in-wheel motors generate maximum output power in a high revolutions range equal to or more than a predetermined number of revolutions that is more than zero, and the in-wheel motors drive the auxiliary drive wheels only when a speed of the vehicle is higher than a predetermined speed, and wherein the body side motor generates maximum output power in a low revolutions range less than the predetermined number of revolutions.

2. The vehicle drive device according to claim 1, wherein the in-wheel motor is an induction motor.

3. The vehicle drive device according to claim 2, wherein the in-wheel motor directly drives the wheel in which the in-wheel motor is provided, without intervention of a deceleration mechanism.

4. The vehicle drive device according to claim 1, wherein the body side motor is a permanent magnet motor.

5. The vehicle drive device according to claim 1, further comprising:

a body side motor that is provided in a body of the vehicle and drives the wheel of the vehicle; and a battery and a capacitor that supply electric power for driving the body side motor and/or the in-wheel motor, wherein a voltage of the battery is applied to the body side motor and a voltage of the battery and the capacitor that are connected in series is applied to the in-wheel motor.

6. The vehicle drive device according to claim 1, further comprising:

an engine, wherein the body side motor is disposed adjacent to the engine.

7. The vehicle drive device according to claim 1, further comprising:

an engine, wherein the body side motor is disposed adjacent to the engine, and the body side motor always generates a driving force when a motor travel mode is set.

8. The vehicle drive device according to claim 1, wherein each of the in-wheel motors is an induction motor.

9. A vehicle drive device that uses in-wheel motors to drive a vehicle, the vehicle drive device comprising:

a body side motor that is provided in a body of the vehicle and drives main drive wheels of the vehicle, the body side motor being not provided in either of the main drive wheels; and in-wheel motors that are provided in auxiliary drive wheels of the vehicle respectively and drive the auxiliary drive wheels respectively, wherein the in-wheel motors generate maximum output power in a high vehicle speed range equal to or more than a predetermined vehicle speed that is more than zero, and the in-wheel motors drive the auxiliary drive wheels only when a speed of the vehicle is higher than predetermined speed, and wherein the body side motor generates maximum output power in a low revolutions range less than the predetermined vehicle speed.

10. The vehicle drive device according to claim 9, further comprising:

an engine, wherein the body side motor is disposed adjacent to the engine.

11. The vehicle drive device according to claim 9, further comprising:

an engine, wherein the body side motor is disposed adjacent to the engine, and the body side motor always generates a driving force when a motor travel mode is set.

12. The vehicle drive device according to claim 9, wherein each of the in-wheel motors is an induction motor.

* * * * *